(12) United States Patent
Desnoyer et al.

(10) Patent No.: US 9,715,731 B2
(45) Date of Patent: Jul. 25, 2017

(54) SELECTING A HIGH VALENCE REPRESENTATIVE IMAGE

(71) Applicant: Neon Labs Inc., San Francisco, CA (US)

(72) Inventors: Mark Desnoyer, San Francisco, CA (US); Sophie Lebrecht, San Francisco, CA (US); Sunil Mallya, San Francisco, CA (US); Deborah Johnson, San Francisco, CA (US); Padraig Michael Furlong, Sunnyvale, CA (US); Michael J. Tarr, Pittsburgh, PA (US); Nicholas Paul Dufour, San Francisco, CA (US); David Henry Lea, San Jose, CA (US)

(*) Notice: Subject to any disclaimer, the term of this patent is extended or adjusted under 35 U.S.C. 154(b) by 0 days.

(21) Appl. No.: 14/981,094

(22) Filed: Dec. 28, 2015

(65) Prior Publication Data

US 2016/0188997 A1  Jun. 30, 2016

Related U.S. Application Data

(60) Provisional application No. 62/097,569, filed on Dec. 29, 2014.

(51) Int. Cl.
G06K 9/52 (2006.01)
G06K 9/62 (2006.01)
G06K 9/00 (2006.01)
G06T 7/00 (2017.01)

(52) U.S. Cl.
CPC ........ *G06T 7/0022* (2013.01); *G06K 9/00744* (2013.01)

(58) Field of Classification Search
CPC ...... G06T 7/0022; G06T 7/97; G06K 9/00744
See application file for complete search history.

(56) References Cited

U.S. PATENT DOCUMENTS

2012/0106925 A1  5/2012  Dirik
2014/0099034 A1  4/2014  Rafati
(Continued)

FOREIGN PATENT DOCUMENTS

WO   WO 2014/078530 A1   5/2014

OTHER PUBLICATIONS

Written Opinion of the International Searching Authority for International Application No. PCT/US2015/067713, May 2, 2016.
(Continued)

*Primary Examiner* — David F Dunphy
(74) *Attorney, Agent, or Firm* — Baker Botts L.L.P.

(57) ABSTRACT

In one embodiment, a plurality of images is received. The plurality of images are frames of a video file. A user requests for a thumbnail picture representative of the plurality of images. The plurality of images are filtered to obtain a set of images. The filtering can be based on a blurriness of the image, whether an image is near a scene transition, an amount of text depicted in the image, or a color level of the image. Valence scores may be determined for one or more of the images in the set of images. Valence scores are based on determining values of characteristics of an image that can predict user responses to the image. A first image from the set of images is selected based at least in part on the valence score of the first image. The first image is sent for display.

51 Claims, 9 Drawing Sheets

(56) References Cited

U.S. PATENT DOCUMENTS

| | | | |
|---|---|---|---|
| 2014/0195643 A1* | 7/2014 | Liu | H04L 67/06 709/217 |
| 2014/0269930 A1 | 9/2014 | Robinson | |
| 2014/0334797 A1 | 11/2014 | Lee | |
| 2015/0110407 A1* | 4/2015 | Sinha | G06K 9/6267 382/225 |
| 2015/0131967 A1* | 5/2015 | Batiz | G06K 9/6254 386/241 |
| 2015/0365716 A1* | 12/2015 | Fonseca, Jr. | H04N 5/44543 725/41 |
| 2016/0063343 A1* | 3/2016 | Loui | G06K 9/4604 382/195 |

OTHER PUBLICATIONS

Notification of Transmittal of International Search Report and Written Opinion for International Application No. PCT/US2015/067713, May 2, 2016.

PCT International Search Report for International Application No. PCT/US2015/067713, May 2, 2016.

\* cited by examiner

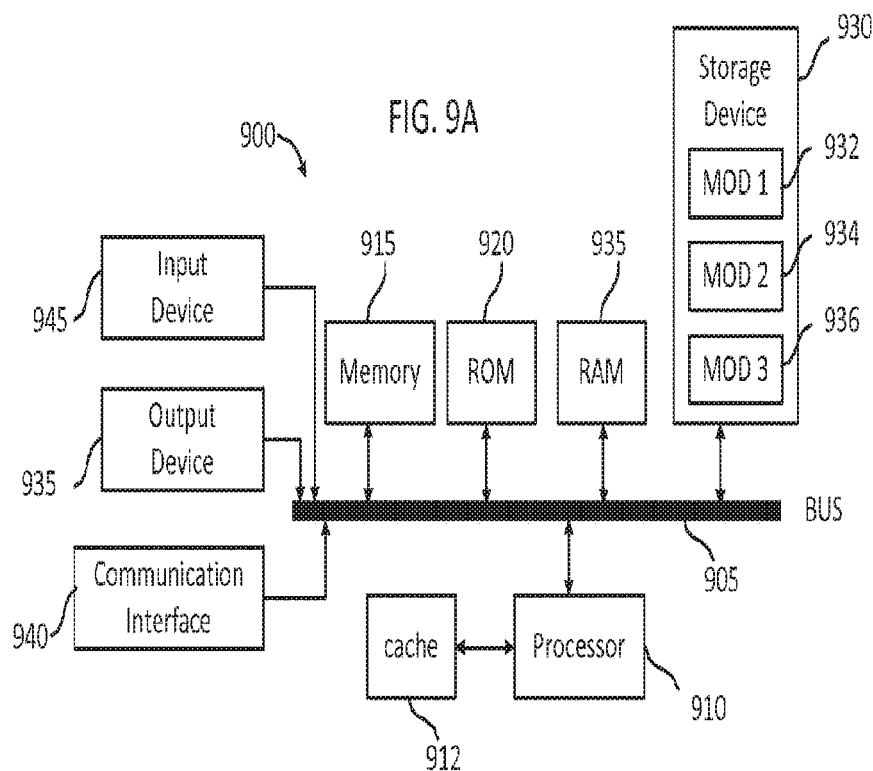
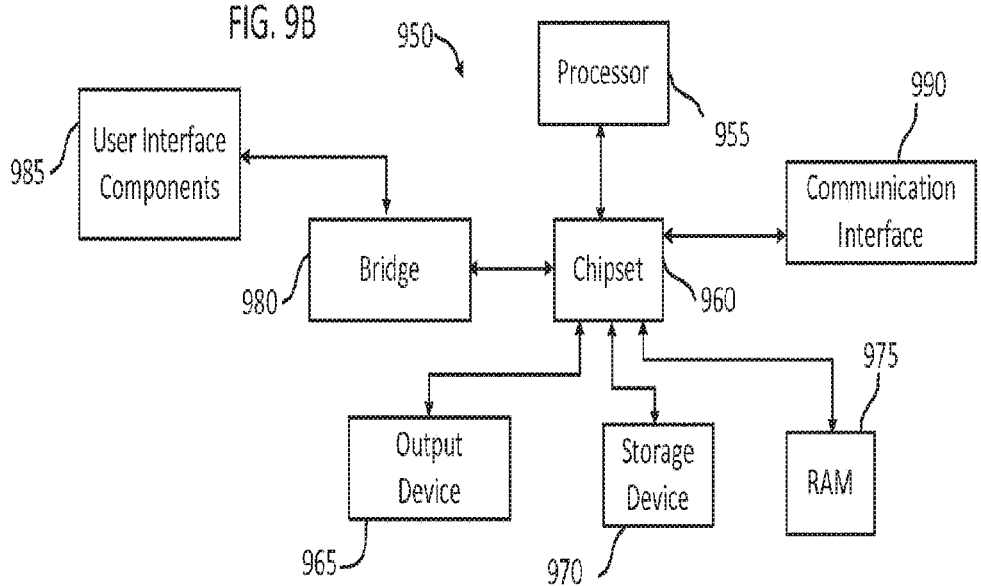

SELECTING A HIGH VALENCE REPRESENTATIVE IMAGE

PRIORITY

This application claims the benefit, under 35 U.S.C. §119(e), of U.S. Provisional Patent Application No. 62/097,569, filed 29 Dec. 2014, which is incorporated herein by reference.

TECHNICAL FIELD

This disclosure generally relates to image and video processing systems and methods.

BACKGROUND

With the continued advancement of network connectivity and the Internet, video has become readily accessible in daily life. For example, many websites, such as news sites, sports sites, do it yourself (DIY) sites, etc., provide videos that a user may select to view at their convenience. Further, on-demand programming, such as on-demand television, subscription movie services, etc., allow a user to select to watch any of a variety of videos, movies, television shows, etc. Often, the available videos are presented along with one or more thumbnail images to represent the video. For example, videos such as a movie may be presented with a thumbnail image that represents the movie. This may include a thumbnail image of a promotional image prepared for the movie, an image frame selected from the movie, etc. Thumbnail images presented to represent a video may provide the user with insight regarding the content of the video as well as attempt to entice the user to select to view the video.

While high production videos, such as Hollywood feature movies, may have professionally prepared promotional images that may be used as a representative image, these types of promotional images may be expensive and time consuming to prepare. It may not be financially viable to produce these types of promotional images for shorter videos, such as sports highlights, news stories, etc. Current systems may select an image frame from the video at random to be a representative image, however these this type of selection may not result in a representative image that best serves to provide the user with an idea of the video and/or to entice the user to view the video.

SUMMARY OF PARTICULAR EMBODIMENTS

Disclosed are systems, methods, and non-transitory computer-readable storage media for selecting representative images from content based on valence. Content may be made up of multiple individual images. One or more of the images may be selected as representative images that may be presented, for example, as a thumbnail image to provide a user with information about the content as well as entice the user to consume the content.

The disclosed technology addresses the dearth in the art for selecting representative image frames based on valence. For example, a video may be a movie, picture album, highlight, etc., that includes multiple image frames that make up the video. One or more of the image frames of a video may be selected as representative images that may be presented as a thumbnail image of the video to provide a user with information about the video as well as entice the user to view the video.

In some embodiments, representative images may be selected based on a valence score calculated for at least some content. A valence score may represent an estimated intrinsic attractiveness (positive valence) or unattractiveness (negative valence) of an image. The valence score for an image may be calculated by analyzing image similarity between the image and images in a data store of images that have known valence score values. Images with the highest valence scores may be selected as representative images for content.

In some embodiments, scored images from content (e.g., images for which a valence score has been calculated) may be clustered into one or more image clusters. The scored images may be clustered based on similarity such that images determined to be visually similar to each other may be included in the same cluster. As a result, each image cluster may include images that are visually distinct from images in other image clusters. A representative image may be selected from one or more of the image clusters, thereby ensuring that representative images selected for a video differ from each other visually.

In some embodiments, the images from content may be filtered prior to valence scores being calculated for the images. For example, the images may be filtered to remove images determined to be unsuitable for selection as a representative image. Filtering the images prior to calculating valence scores may reduce computing resource usage and/or processing time to select representative images. Images may be selected as unsuitable for selection as a representative image based on factors such as blurriness, having too much text, having too much of the same color, etc.

BRIEF DESCRIPTION OF THE DRAWINGS

FIGS. 9A and 9B depict diagrams of examples of computing devices.

DESCRIPTION OF EXAMPLE EMBODIMENTS

Figure 1:
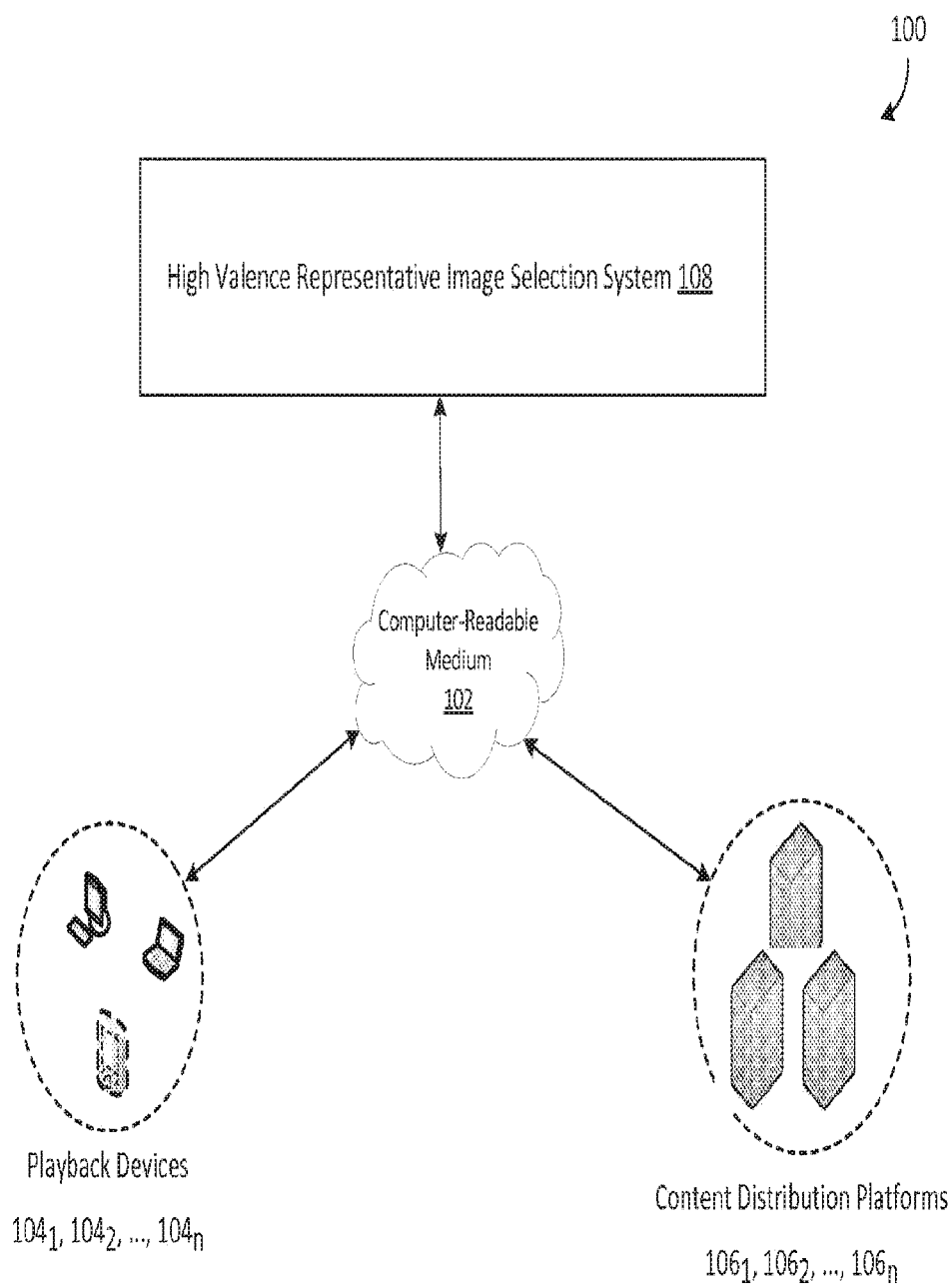
FIG. 1 depicts a diagram of example of a system for providing a high valence representative image in association with content.

FIG. 1 depicts a diagram 100 of an example of a system for providing a high valence representative image in association with content. The diagram 100 may include a computer-readable medium (CRM) 102, playback devices 104-1 to 104-n (collectively, "playback devices 104"), content distribution platforms 106-1 to 106-n (collectively, "content distribution platforms 106"), and a high valence representative image-selection system 108 ("image-selection system 108").

In the example of FIG. 1, the computer-readable medium 102 may include communications hardware within a single computer, a device locally attached to a computer, or a networked system that includes several computer systems coupled together, such as a local area network (LAN) or wide area network (WAN), such as the Internet. The term "Internet" as used herein may refer to a network of networks that may use certain protocols, such as the TCP/IP protocol, and possibly other protocols, such as the hypertext transfer protocol (HTTP) for hypertext markup language (HTML) documents that make up the World Wide Web ("the web"). More generally, one or more other networks may include, for example, a WAN, metropolitan area network (MAN), campus area network (CAN), LAN, personal area network (PAN), but the one or more other networks may at least theoretically be of any size or characterized in some other fashion (e.g., body area network (BAN), near-me area network (NAN), home area network (HAN), or Internet area network (IAN), to name a couple of example alternatives).

In particular embodiments, networks may include enterprise private networks and virtual private networks (collectively, "private networks"). As the name suggests, private networks may be under the control of a single entity. Private networks may include a head office and optional regional offices (collectively, offices). Many offices may enable remote users to connect to the private network offices via some other network, such as the Internet. One or more other networks, as described in this paper, may or may not include a private network(s). In specific implementations, networks may be implemented as a WAN, wireless LAN (WLAN), public switched telephone network (PSTN), cellular network, or some other network or combination of similar or different networks capable of coupling two private networks. As an example and not by way of limitation, the term "enterprise network" may encompass any network or subnet under the control of a single party, regardless of whether the party would be referred to as a "home owner" or a "business."

In particular embodiments, a computing system may include at least a processor and memory, and may include a device (e.g., a bus) coupling the memory to the processor and other components, such as non-volatile storage, an interface, or the like. The processor may be, for example, a general-purpose central processing unit (CPU), such as a microprocessor, or a special-purpose processor, such as a microcontroller.

In particular embodiments, the memory may include random access memory (RAM), such as dynamic RAM (DRAM) and static RAM (SRAM). The memory may be local, remote, or distributed. As used herein, the term "computer-readable storage medium" is intended to include only physical media, such as memory. A computer-readable medium may be intended to include all mediums that are statutory (e.g., in the United States, under 35 U.S.C. §101), and to specifically exclude all mediums that are non-statutory in nature to the extent that the exclusion is necessary for a claim that includes the computer-readable medium to be valid. As an example and not by way of limitation, known statutory computer-readable mediums may include hardware (e.g., registers, random access memory (RAM), non-volatile (NV) storage, to name a few), but may or may not be limited to hardware.

In particular embodiments, the bus may also couple the processor to the non-volatile storage. As an example and not by way of limitation, the non-volatile storage may often be a magnetic floppy or hard disk, a magnetic-optical disk, an optical disk, a read-only memory (ROM), such as a CD-ROM, EPROM, or EEPROM, a magnetic or optical card, or another form of storage for large amounts of data. In particular embodiments, some of this data may often be written, by a direct memory access process, into memory during execution of software on the computer system. The non-volatile storage may be local, remote, or distributed. The non-volatile storage is optional because systems may be created with all applicable data available in memory.

In particular embodiments, software may typically be stored in the non-volatile storage. Indeed, for large programs, it may not even be possible to store the entire program in the memory. Nevertheless, it should be understood that for software to run, if necessary, it may be moved to a computer-readable location appropriate for processing, and for illustrative purposes, that location is referred to as the memory herein. In particular embodiments, even when software is moved to the memory for execution, the processor may typically make use of hardware registers to store values associated with the software, and local cache that, ideally, may serve to speed up execution. As used herein, a software program may be assumed to be stored at any known or convenient location (from non-volatile storage to hardware registers) when the software program is referred to as "implemented in a computer-readable storage medium." In particular embodiments, a processor may be considered to be "configured to execute a program" when at least one value associated with the program is stored in a register readable by the processor.

As an example and not by way of limitation, the computer system may be controlled by operating system software, which is a software program that includes a file management system, such as a disk operating system. An example of operating system software with associated file management system software may be the family of operating systems known as Windows® from Microsoft Corporation of Redmond, Wash., and their associated file management systems. Another example of operating system software with its associated file management system software may be the Linux operating system and its associated file management system. In particular embodiments, the file management system may be typically stored in the non-volatile storage and may cause the processor to execute the various acts required by the operating system to input and output data and to store data in the memory, including storing files on the non-volatile storage.

In particular embodiments, the bus may also couple the processor to the interface. The interface may include one or more input and/or output (I/O) devices. The I/O devices may include, by way of example but not limitation, a keyboard, a mouse or other pointing device, disk drives, printers, a scanner, and other I/O devices, including a display device. In particular embodiments, the display device may include, by way of example but not limitation, a cathode ray tube (CRT), liquid crystal display (LCD), or some other applicable known or convenient display device. In particular embodiments, the interface may include one or more of a modem or network interface. In particular embodiments, a modem or network interface may be considered to be part of the computer system. As an example and not by way of limitation, the interface may include an analog modem, isdn modem, cable modem, token ring interface, satellite transmission interface (e.g. "direct PC"), or other interfaces for coupling a computer system to other computer systems. Interfaces may enable computer systems and other devices to be coupled together in a network.

In particular embodiments, networks may include enterprise private networks and virtual private networks (collectively, private networks). As an example and not by way of limitation, private networks may be under the control of an entity rather than being open to the public. Where context dictates a single entity would control a network, it may be understood that reference to a network is a reference to the private portion subset of that network. As an example and not by way of limitation, a LAN may be on a WAN, but only the LAN under the control of an entity; so if an engine controls policy on the network, it may be that the engine only controls policy on the LAN (or some other subset of the WAN). In particular embodiments, private networks may include a head office and optional regional offices (collectively, offices). In particular embodiments, many offices may enable remote users to connect to the private network offices via some other network, such as the Internet.

The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). In particular embodiments, content may be often provided by content servers, which are referred to as being "on" the Internet. In particular embodiments, a web server, which is one type of content server, may be typically at least one computer system which may operate as a server computer system and may be configured to operate with the protocols of the World Wide Web and is coupled to the Internet. The physical connections of the Internet and the protocols and communication procedures of the Internet and the web are well known to those of skill in the relevant art.

Referring once again to the example of FIG. 1, for illustrative purposes, it may be assumed the CRM 102 broadly includes, as understood from relevant context, anything from a minimalist coupling of the components, or a subset of the components, illustrated in the example of FIG. 1, to every component of the Internet and networks coupled to the Internet. In the example of FIG. 1, the computer-readable medium 102 may include a data path, such as a bus, in a computer. As an example and not by way of limitation, one or more of the components illustrated in the example of FIG. 1 may be implemented on the same machine.

In the example of FIG. 1, the playback devices 104 may be coupled to the CRM 102. As an example and not by way of limitation, playback devices 104 may include a personal computing device such as a desktop or workstation, a business server, or a portable computing device, such as a laptop, smart phone, or a tablet PC. In particular embodiments, the playback devices 104 may be capable of network communication via the CRM 102. The playback devices 104, and more generally any computing device described in this paper, may or may not include some or all of the features, components, and peripherals of computing device 900 of FIGS. 9A and 9B. In particular embodiments, to facilitate communication with other computing devices, playback devices 104 may include a communication interface configured to receive a communication, such as a request, data, etc., from another computing device in network communication and pass the communication along to an appropriate module running on the computing device. The communication interface may also be configured to send a communication to another computing device in network communication with the computing device.

In the example of FIG. 1, the content distribution platforms 106 may be coupled to the CRM 102. In particular embodiments, the content distribution platforms 106 may comprise one or more computing devices and one or more datastores including at least some video content. In a specific implementation, the video content is in the form of a sequence of frames that is intended to be presented in order. The video content may often be referred to colloquially as "a video" or "a video clip." In particular embodiments, the video content may comprise multiple images that are not arranged sequentially, such as a collection of digital photographs. As used in this paper, "content" may refer to a video or a collection of images, though "frames" or "video frames" are intended to refer only to a video clip. Many techniques described in this paper may be utilized to select a representative image from a video or from a collection of images.

In the example of FIG. 1, image-selection system 108 is coupled to the CRM 102. A more detailed illustration of an example representative image frame system is presented in the example of FIG. 3, which is described later.

In particular embodiments, image-selection system 108 may receive content from content distribution platforms 106 and may select, from multiple images that are a part of the content, one or more representative images that have the highest detected or assigned valence. Image-selection system 108 may filter images prior to selecting a representative image by, for example, parsing the images, removing images that are not ideal (e.g., because of coloration, too much text, poor image quality, etc.). As an example and not by way of limitation, image-selection system 108 may determine for a particular image that the majority of the image is the same color. This may indicate that the image is a scene transition, or the beginning or end of a video clip. Image-selection system 108 may determine that such an image is not useful even for determining valence, and filter out the image from consideration. As another example, image-selection system 108 may determine that a particular image is too blurry, based on edge detection techniques. In particular embodiments, a blurry image may indicate that there is a scene transition or camera cut, the image quality is too poor, or the camera is re-focusing the image. In any of these example situations, image-selection system 108 may determine that such images should not be considered for selection, and filter them out.

In particular embodiments, image-selection system 108 may receive a request for a representative image (e.g. a thumbnail) to be sent from image-selection system 108. In particular embodiments, the representative images may be provided along with other representative images on a display, enabling a user of the playback device to select from among the representative images to indicate interest in the associated content. As an example and not by way of limitation, each representative image may be presented in association with a trigger suitable to indicate interest on the part of a potential consumer. A relatively ubiquitous trigger may be a "click" which may be accomplished by way of example but not limitation by overlaying the representative image or a thumbnail thereof with a clickable field within an interactive web page. In particular embodiments, any applicable mechanism by which interest may be indicated could be used (e.g., checkbox, pulldown menu, scanning a QR code, etc.). Upon receipt of an indication of interest from a potential content playback consumer, image-selection system 108 may provide at least a portion of the content, instruct a relevant one of the content distribution platforms 106 to provide at least a portion of the content, or connect the potential content playback consumer with a third party system that is capable of providing at least a portion of the content (and allow the potential consumer and the third party system to communicate with one another, which may entail the consumer purchasing the content and may further entail the third party system providing some form of compensation for the referral).

Selection of Images from a Video

Figure 2:
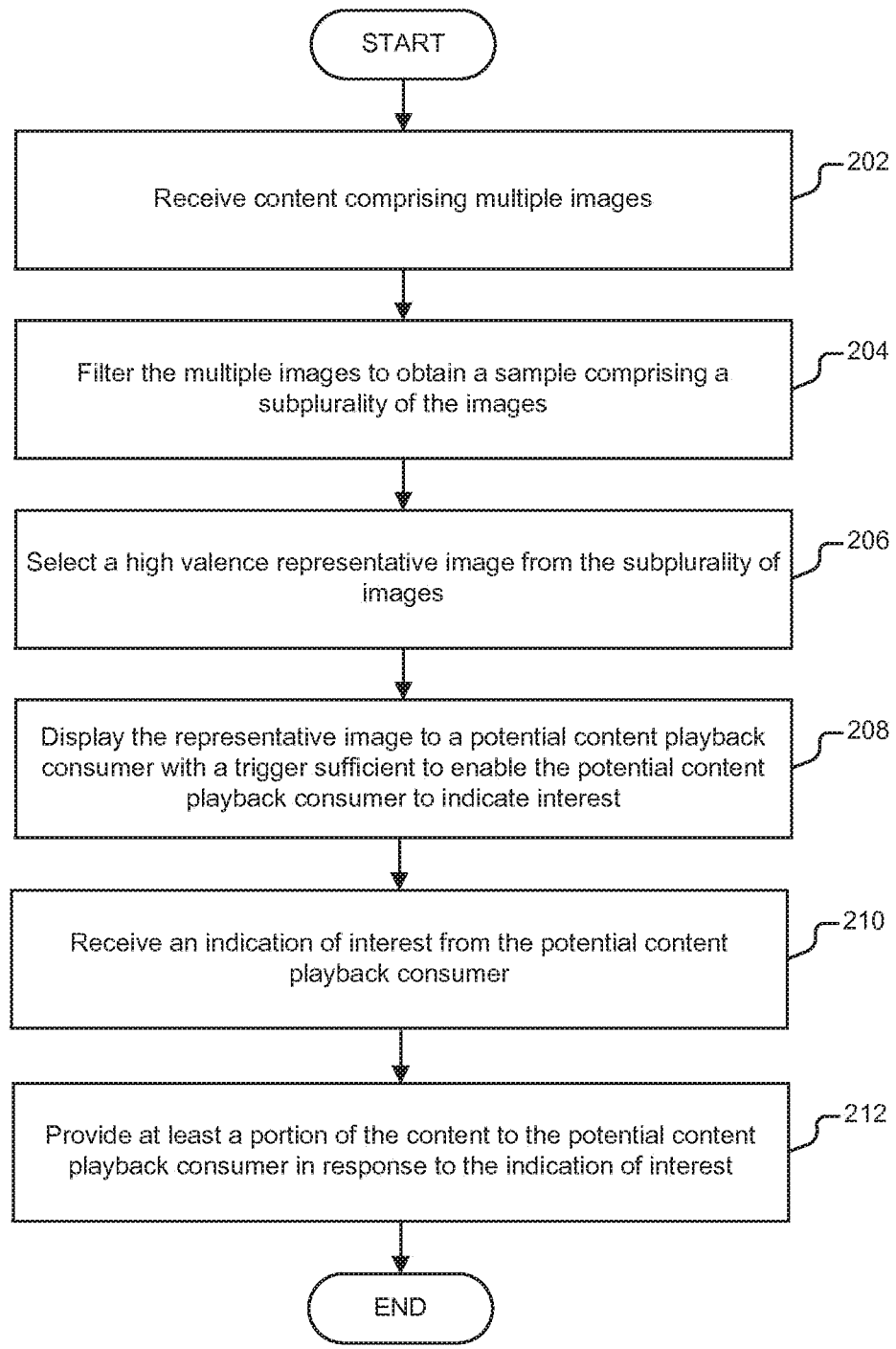
FIG. 2 depicts a flowchart of an example of a method for providing a high valence representative image in association with content.

FIG. 2 depicts an illustrative example method 200 for providing a high valence representative image in association with content. FIG. 2 includes multiple modules arranged serially, but the modules may be arranged differently or arranged for execution in parallel.

In the example of FIG. 2, the method 200 may start at step 202 by receiving content comprising multiple images. For the purpose of this example, a plurality of images may be required because no representative image may be selected if there are not at least two images.

In the example of FIG. 2, the method 200 may proceed to step 204 with filtering the multiple images to obtain a sample comprising a subplurality of the images. Filtering may reduce the computational consumption imposed on a system that computes valence for each image. Some forms of filtering are image-specific, such as determining whether an image is blurry and excluding it from the potential representative images because of that. Some forms of filtering are based upon parsing, such as by determining valence for a subset of images and using the location of the images within a sequence of frames to determine what other images should be considered. In particular embodiments, filtering based on determined valence scores may occur after filtering based on image content. As an example and not by way of limitation, a set of images may comprise a total of 1000 frames. A filtering step based on the content depicted in each image may eliminate 200 frames, leaving 800 to be analyzed for valence. Out of the 800 remaining frames, only 10 frames, scattered throughout the original set, may be selected based on valence scores. In particular embodiments, the two filtering steps described above may occur concurrently with each other.

In the example of FIG. 2, the method 200 may proceed to step 206 with selecting a high valence representative image from the subplurality of images. Valence is described in more detail later. As an example and not by way of limitation, the highest valence image that may be efficiently selected is used as the high valence representative image. In particular embodiments, multiple high valence images may be selected as the representative images. In particular embodiments, one of the multiple high valence images may be selected using variable factors, such as a potential content consumer's preferences.

In the example of FIG. 2, the method 200 may proceed to step 208 with displaying the representative image to a potential playback consumer with a trigger sufficient to enable the potential content playback consumer to indicate interest. As an example and not by way of limitation, the representative image may be displayed in a web page and a potential playback consumer may click on the representative image to indicate interest.

In the example of FIG. 2, the method 200 may proceed to step 210 with receiving an indication of interest from the potential content playback consumer. As an example and not by way of limitation, the potential playback consumer may click on the representative image and the click is captured by the potential playback consumer's browser and reported.

In the example of FIG. 2, the method 200 may proceed to step 212 with providing at least a portion of the content to the potential content playback consumer in response to the indication of interest. As an example and not by way of limitation, the content may be streamed to the potential playback consumer's browser. In particular embodiments, the content may be streamed from an applicable content server, and additional steps may be required (such as receipt of payment, having the potential content playback consumer become a member, or the like) prior to streaming.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
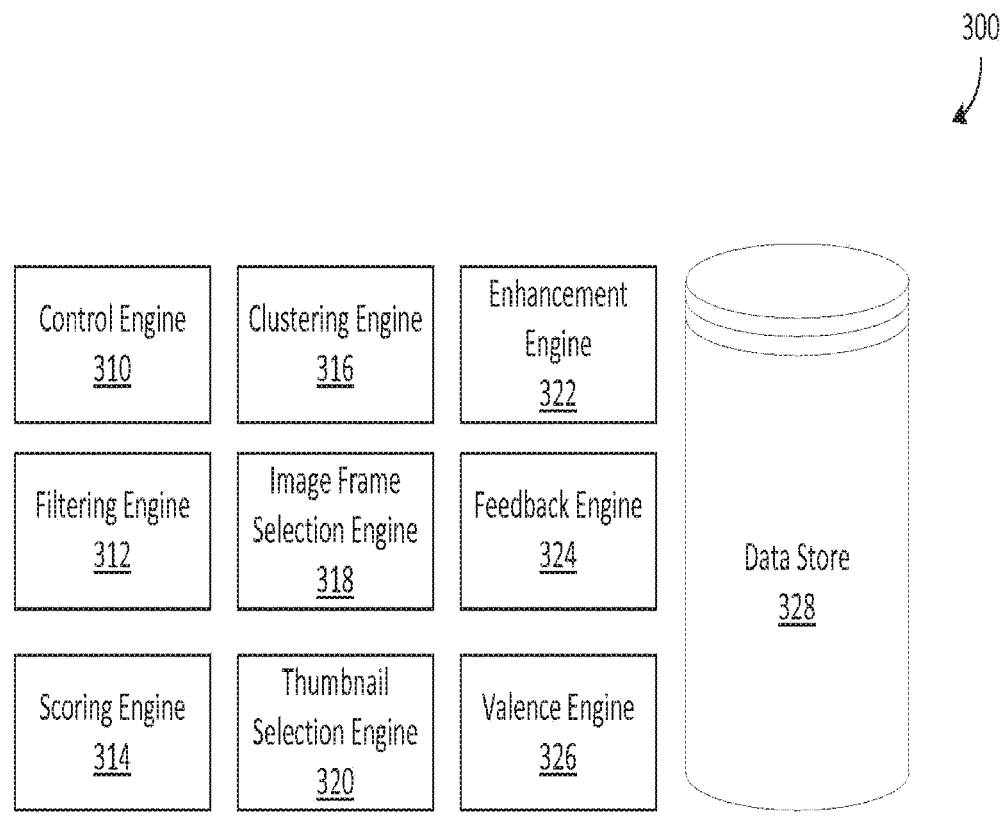
FIG. 3 depicts a diagram of an example of a high valence representative image selection system.

FIG. 3 depicts a diagram 300 of an example of a high valence representative image-selection system 108. The diagram 300 may include a control engine 310, a filtering engine 312, a scoring engine 314, a clustering engine 316, an image frame selection engine 318, a thumbnail selection engine 320, an enhancement engine 322, a feedback engine 324, a valence engine 326, and a datastore 328. In particular embodiments, an engine may include at least two components: 1) a dedicated or shared processor and 2) hardware, firmware, and/or software executed by the processor. In particular embodiments, an engine may be centralized or its functionality distributed. In particular embodiments, an engine may include special purpose hardware, firmware, or software embodied in a computer-readable medium for execution by the processor. In particular embodiments, the processor transforms data into new data using implemented data structures and methods, such as is described with reference to the figures described herein.

In particular embodiments, the engines described herein, or the engines through which the systems and devices described in this paper may be implemented, may be cloud-based engines. As used herein, a cloud-based engine is an engine that may run applications and/or functionalities using a cloud-based computing system. In particular embodiments, all or portions of the applications and/or functionalities may be distributed across multiple computing devices, and may not necessarily be restricted to only one computing device. In particular embodiments, the cloud-based engines may execute functionalities and/or modules that end users access through a web browser or container application without having the functionalities and/or modules installed locally on the end-users' computing devices.

As used herein, datastores may include repositories having any applicable organization of data, including tables, comma-separated values (CSV) files, traditional databases (e.g., SQL), or other applicable known or convenient organizational formats. In particular embodiments, datastores may be implemented as software embodied in a physical computer-readable medium on a general- or specific-purpose machine, in firmware, in hardware, in a combination thereof, or in an applicable known or convenient device or system. In particular embodiments, datastore-associated components, such as database interfaces, may be considered "part of" a datastore, part of some other system component, or a combination thereof, though the physical location and other characteristics of datastore-associated components is not critical for an understanding of the techniques described herein.

In particular embodiments, datastores may include data structures. As used herein, a data structure is associated with a particular way of storing and organizing data in a computer so that it may be used efficiently within a given context. In particular embodiments, data structures may be based on the ability of a computer to fetch and store data at any place in its memory, specified by an address, a bit string that may be itself stored in memory and manipulated by the program. Some data structures may be based on computing the addresses of data items with arithmetic operations; while other data structures may be based on storing addresses of data items within the structure itself. In particular embodiments, many data structures use both principles, sometimes combined in non-trivial ways. In particular embodiments, the implementation of a data structure usually entails writing a set of procedures that create and manipulate instances of that structure. In particular embodiments, the datastores described herein may be cloud-based datastores. As an example and not by way of limitation, a cloud-based datastore is a datastore that is compatible with cloud-based computing systems and engines.

In the example of FIG. 3, the control engine 310 may be intended to represent a subsystem that receives a representative image request to select a representative image from a video. In particular embodiments, the representative image request may be suitable to identify a representative image from suitable content. In particular embodiments, the control engine 310 may or may not prompt a potential content consumer to provide the representative image request.

In particular embodiments, a representative image request may identify content and/or the location of content and may prompt the control engine 310 to select representative image frames from suitable content. As an example and not by way of limitation, the representative image request may include a path identifier identifying the location of a video hosted or maintained by a content distribution platform. As another example, the representative image request may include a content identifier that identifies a video stored in the datastore 328. In particular embodiments, each video stored in the data store 328 may be associated with a unique content identifier. The representative image request may include a video identifier identifying a video stored in the data store 328.

In particular embodiments, the control engine 310 may download the suitable content. As an example and not by way of limitation, the control engine 310 may use a path identifier received in a representative image request to access a video from a content distribution platform and download the video. In particular embodiments, video downloaded from the video distribution platforms may be stored locally, for example, in the data store 328.

In particular embodiments, the control engine 310 may communicate with other engines (e.g., filtering engine 312, scoring engine 314, etc.) to initiate selection of a representative image from a video. As an example and not by way of limitation, in response to receiving a representative image request to select a representative image from a video, the control engine 310 may communicate with one or more other engines to initiate selection of a representative image from the video.

In particular embodiments, the scoring engine 314 may be configured to calculate a valence score for one or more image frames of a video. In particular embodiments, a valence score may represent an estimated intrinsic attractiveness (positive valence) or unattractiveness (negative valence) of an image frame. In particular embodiments, to calculate the valence score for a target image frame from a video, the scoring engine 314 may analyze image similarity between the target image frame and reference image frames from a database of reference image frames that have known valence score values. As an example and not by way of limitation, the data store 328 may include a database of reference image frames that have known valence scores and the scoring engine 314 may communicate with the data store 328 to access the database of reference image frames. In particular embodiments, the database of reference image frames may be generated by the valence engine 326, as discussed in further detail below.

In particular embodiments, the scoring engine 314 may analyze similarity between a target image frame and the reference image frames to determine a set of similar reference image frames from the database that are visually similar to the target image frame. As an example and not by way of limitation, the scoring engine 314 may determine a similarity score between the target image frames and the reference image frames and select a predetermined number of reference image frames with the highest similarity score to be the set of similar reference image frames. As another example and not by way of limitation, the scoring engine 314 may select each reference image frame determined to have a similarity score that meets or exceeds a predetermined similarity threshold value to be the set of similar reference image frames.

In particular embodiments, the scoring engine 314 may calculate the valence score for the target image frame based on the valence scores for the set of similar reference image frames. As an example and not by way of limitation, the scoring engine 314 may calculate the valence score for the target image frame by calculating the average valence score of the set of similar reference image frames. In particular embodiments, the scoring engine 314 may calculate the valence score for the target image frame by determining the mean of the valence scores of the set of similar reference image frames.

In particular embodiments, the scoring engine 314 may be configured to calculate the valence scores based on factors in addition to the reference image frames. As an example and not by way of limitation, the scoring engine 314 may calculate the valence scores based on an analysis of the content of the image frames. Certain image features, such as colors, images, objects, persons, actions, etc., may be considered to be favorable to users and thus the inclusion of these image features in an image frame may increase the valence score of the image frame. Likewise, certain image features may be considered unfavorable and thus their inclusion in an image frame may decrease the valence score of the image frame.

In particular embodiments, the scoring engine 314 may be configured to analyze the image frames to identify specified image features and adjust the valence score of the image frame accordingly. As an example and not by way of limitation, the scoring engine 314 may analyze the image frames to determine whether the image frames include faces, which may be considered favorable. In particular embodiments, the scoring engine 314 may determine whether the image frames include celebrity faces. As an example and not by way of limitation, if an image frame includes the face of a popular celebrity, the scoring engine 314 may increase the valence score for the image frame.

In particular embodiments, the scoring engine 314 may determine whether the image frames depict a person that is female or male, and adjust the valence score accordingly. As an example and not by way of limitation, images of females may be preferred and the valence score for image frames depicting females may be increased by the scoring engine 314. As another example and not by way of limitation, images of males may be preferred and the valence score for image frames depicting males may be increased by the scoring engine 314.

In particular embodiments, the scoring engine 314 may calculate the valence score based on the emotions of persons depicted in the image frames. As an example and not by way of limitation, the scoring engine 314 may increase the valence score for image frames determined to depict positive emotions, such as a person smiling. As another example, the scoring engine 314 may decrease the valence score for image frames determined to depict negative emotions, such as a person frowning or crying.

In particular embodiments, the scoring engine 314 may calculate the valence scores for image frames based on actions depicted in the image frames. As an example and not by way of limitation, certain actions such as running, jumping, etc. may be considered favorable, while other actions, such as sleeping, sitting, etc., may be considered unfavorable. In particular embodiments, if the scoring engine 314 determines that an image frame depicts an image frame considered favorable, the scoring engine 314 may increase the valence score for the image frame. In particular embodiments, if the scoring engine 314 determines that an image frame depicts an image frame considered unfavorable, the scoring engine 314 may decrease the valence score for the image frame.

In particular embodiments, the scoring engine 314 may apply different weights to the valence scores of the set of similar reference image frames when calculating the valence score of the target image frame. As an example and not by way of limitation, the scoring engine 314 may apply a weight to a reference image frame from the set of similar reference image frames based on the similarity between the reference image frame and the target image frame. In particular embodiments, the scoring engine 314 may apply a higher weight to valence scores for reference image frames that are determined to be more similar to the target image frame, resulting in the valence scores of those reference image frames having a greater impact on the valence score for the target image frame. In particular embodiments, the scoring engine 314 may apply a lower weight to valence scores for reference image frames that are determined to be less similar to the target image frame, resulting in the valence scores of those reference image frames having a lesser impact on the valence score for the target image frame.

In particular embodiments, the scoring engine 314 may be configured to calculate a valence score for each image frame from a video. In particular embodiments, the scoring engine 314 may be configured to calculate a valence score for a subset of the image frames from a video, thereby potentially reducing the computing resource usage and/or time required to calculate the valence scores. As an example and not by way of limitation, the scoring engine 314 may calculate a valence score for a predetermined percentage or number of image frames from the video, such as 20% of the image frames or 200 image frames. As another example and not by way of limitation, the scoring engine 314 may calculate a valence score for 1 out of every 10 image frames of the video, thereby reducing the number of calculation performed by the scoring engine 314 while still resulting in a sample including valence scores that are consistently distributed throughout the video.

In particular embodiments, the scoring engine 314 may calculate the valence scores for a small subset of the image frames of a video and select further image frames based on the valence scores of the small subset of image frames. As an example and not by way of limitation, the scoring engine 314 may calculate valence scores for a subset of image frames selected from the beginning, middle and end of a video. The scoring engine 314 may then select further image frames based on the valence scores of the subset of image frames. As another example, if the scoring engine 314 determines that the image frames from the end of the video have the highest valence scores, the scoring engine 314 may calculate the valence score for other image frames selected from the end of the video.

In particular embodiments, the scoring engine 314 may repeat the process of calculating valence scores to continue to refine selection of image frames. As an example and not by way of limitation, if the scoring engine 314 determines that the valence scores for the image frames selected from the middle and end of the video are higher than the valence scores for the image frames selected from the beginning of the video, the scoring engine 314 may repeat the process on image frames selected only from the second half of the video. As another example and not by way of limitation, the scoring engine 314 may calculate the valence score for image frames selected from the beginning, middle and end of the second half of the video, without selecting any new image frames from the first half of the video. In particular embodiments, the scoring engine 314 may be configured to repeat this process any number of times to further refine selection of image frames to be scored for valence.

In particular embodiments, to further reduce the computing resource usage and/or time to calculate the valence scores, the filtering engine 312 may be configured to filter out image frames from a video prior to calculating the valence scores for the image frames. As an example and not by way of limitation, the filtering engine 312 may filter out image frames that are determined to be unsuitable for selection as a representative image frame for the video. The filtering engine 312 may analyze the image frames from a video and filter out image frames determined to be unsuitable for selection as a representative image frame prior to the scoring engine 314 calculating valence scores for the image frames.

In particular embodiments, filtering engine 312 may filter the image frames based on numerous factors such as blurriness, amount of text, unicolor level, etc. As an example and not by way of limitation, the filtering engine 312 may perform a quick analysis of the image frames to determine a blurriness level of each image. In particular embodiments, image frames determined to meet or exceed an acceptable blurriness threshold level may be filtered out by the filtering engine 312.

In particular embodiments, the filtering engine 312 may perform a quick analysis of the image frames to determine an amount of text in the image frames. As an example and not by way of limitation, the filtering engine 312 may filter out image frames determined to include an amount of text that exceeds an acceptable threshold amount of text. As a result, image frames that contain too much text, such as movie credits, may be filtered out as being unsuitable for selection as a representative image frame.

In particular embodiments, the filtering engine 312 may perform a quick analysis of the image frames to determine a unicolor level of the image frames. As an example and not by way of limitation, a unicolor level may indicate the largest amount or percentage of the image frame that is one color or within a predetermined range of a single color. In particular embodiments, the filtering engine 312 may filter out image frames determined to have a unicolor level that meets or exceeds an acceptable unicolor threshold level. As a result, image frames that are all or mainly black, white, etc., may be filtered out as being unsuitable for selection as a representative image frame.

In particular embodiments, upon filtering the image frames for a video to remove image frames determined to be unsuitable for selection as a representative image frame, the filtering engine 312 may provide the filtered set of image frames to the scoring engine 114 to be scored. Pre-filtering the image frames prior to scoring by the scoring engine may reduce the time and/or computing resources required to score the image frames.

In particular embodiments, image frame selection engine 318 may select image frames as representative image frames based on the valence scores calculated for the image frames. As an example and not by way of limitation, the image frame selection engine 318 may be configured to receive a set of scored image frames from the scoring engine 314 or, alternatively, access the set of scored image frames from the data store 328. The set of scored image frames may include one or more image frames for which the scoring engine 314 has calculated a valence score.

In particular embodiments, image frame selection engine 318 may select one or more of the scored image frames as representative image frames for the video. As an example and not by way of limitation, the image frame selection engine 318 may select a predetermined number of the scored image frames with the highest valence score, such as the 5, 10, etc., scored image frames with the highest valence score to be representative image frames for the video. In particular embodiments, the image frame selection engine 318 may select each scored image frame that has a valence score that meets or exceeds a predetermined valence threshold score to be a representative image frame for the video.

In particular embodiments, the image frame selection engine 318 may select one or more scored image frames from different points of the video as representative image frames. As an example and not by way of limitation, the image frame selection engine 318 may select the scored image frame with the highest valence score from the beginning, middle and end of the video to be the representative image frames for the video. In particular embodiments, the image frame selection engine 318 may select a scored image frame with the highest valence score within predetermined time periods of the video to be the representative image frames for the video. As an example and not by way of limitation, the image frame selection engine 318 may select the scored image frame with the highest valence score from each minute of the video to be the representative image frames for the video. Selecting scored image frames from different portions of the video may reduce the likelihood that multiple representative image frames will be visually similar to each other.

In particular embodiments, to further ensure that the representative image frames are visually distinct from each other, the clustering engine 316 may cluster the scored image frames based on visual appearance prior to selection of the representative image frames. As an example and not by way of limitation, the clustering engine 316 may be configured to cluster the scored image frames into two or more clusters based on visual similarity prior to the image frame selection engine 318 selecting representative image frames.

In particular embodiments, the clustering engine 316 may receive the scored image frames from the scoring engine 314 and cluster the scored image frames into unique clusters based on visual similarity. In particular embodiments, a scored image frame may be included in only one of the image frame clusters. In particular embodiments, a scored image frame may be included in more than one image frame cluster.

In particular embodiments, the clustering engine 316 may cluster the image frames based on visual similarity such that each image frame cluster includes image frames that are determined to be visually similar to each other. As an example and not by way of limitation, the clustering engine 316 may determine visual similarity between the image frames using any of a variety of techniques known in the art. The image frame selection engine 318 may select representative image frames from the image frame clusters generated by the clustering engine 316. As another example and not by way of limitation, the image frame selection engine 318 may select the scored image frames from each image frame cluster that have the highest valence scores to be representative image frames for the video. In particular embodiments, selecting representative image frames from the image frame clusters may ensure that the representative image frames include a variety of visually distinct image frames.

In particular embodiments, image frame selection engine 318 may store the representative image frames selected for a video in the data store 328. The stored representative image frames may be associated with their corresponding video. As an example and not by way of limitation, the representative image frames may be indexed according to the video identifier identifying their corresponding video. In particular embodiments, metadata describing the representative image frames may be stored along with the representative image frames. As an example and not by way of limitation, the metadata may include the valence score assigned to the representative image frame, the point of the video at which the representative image frame is positioned, etc.

In particular embodiments, the thumbnail selection engine 320 may be configured to select a thumbnail image for a video from the representative image frames. As an example and not by way of limitation, a thumbnail image may be an image presented along with a video that represents the video. The thumbnail image may provide information regarding the content of the video as well as entice a user to watch the video.

In particular embodiments, the thumbnail selection engine 320 may receive thumbnail requests to provide thumbnail images for a specified video. As an example and not by way of limitation, the thumbnail selection engine 320 may receive a thumbnail requests from a client device. In particular embodiments, a thumbnail request may include an identifier identifying a specified video. As an example and not by way of limitation, a thumbnail request may include a video identifier that identifies a video.

In particular embodiments, in response to receiving a thumbnail request, the thumbnail selection engine 320 may select a thumbnail image for the video and provide the thumbnail image to the requesting client device. As an example and not by way of limitation, the thumbnail selection engine 320 may use the video identifier included in the thumbnail request to identify the representative image frames for the video in the data store 328. In particular embodiments, the thumbnail selection engine 320 may select one of the representative image frames to be the thumbnail image for the video and provide the selected thumbnail image to the requesting client device. The client device may then present the thumbnail image along with the video.

In particular embodiments, the thumbnail selection engine 320 may select one of the representative images to be the thumbnail image based on the valence scores of the representative image frames. As an example and not by way of limitation, the thumbnail selection engine 320 may select the representative image frame with the highest valence score to be the thumbnail image.

In particular embodiments, the thumbnail selection engine 320 may select a thumbnail image from the representative image frames in a set order. As an example and not by way of limitation, the thumbnail selection engine 320 may select the representative image frames in a set rotating order such that each time the thumbnail selection engine 320 receives a thumbnail request for a specified video, the thumbnail selection engine 310 selects the next representative image frame for the video in the set rotating order to be the thumbnail image for the video.

In particular embodiments, the thumbnail selection engine 320 may select a thumbnail image from the representative image frames based on user data about a requesting user. As an example and not by way of limitation, a requesting user may be a user of the client device that transmitted a thumbnail request. The thumbnail selection engine 320 may gather user data regarding the requesting user and select a thumbnail image based on the user data.

In particular embodiments, the data store 328 may maintain user data for multiple users, for example, in user profiles for the users. As an example and not by way of limitation, the user data may include any of a variety of data regarding the users, such as a user identifier identifying the user, user demographic data, user preference data, user feedback data, device identifiers identifying client devices associated with the user, etc.

In particular embodiments, upon receiving a thumbnail request, the thumbnail selection engine 320 may determine the requesting user associated with the thumbnail request and access the data store 328 to gather user data for the user. As an example and not by way of limitation, the thumbnail request may include data identifying the requesting user, such as a user identifier, or data identifying the requesting user's client device, such as a device identifier, which may be used by the thumbnail selection engine 320 to identify the user profile associated with the requesting user. In particular embodiments, the thumbnail request may include user data about the requesting user. For example, user data stored on the client device may be transmitted along with the thumbnail request.

In particular embodiments, the thumbnail selection engine 320 may use the user data to select a thumbnail image for the requesting user. As an example and not by way of limitation, the thumbnail selection engine 320 may select a thumbnail image based on a geographic location of the requesting user. In particular embodiments, the geographic location of the requesting user may include a geographic location associated with the requesting user, such as the requesting user's home address, or, alternatively, a geographic location associated with the requesting user's client device, such as the geographic location of the requesting user's client device when the thumbnail request was transmitted by the client device.

In particular embodiments, thumbnail selection engine 320 may select a representative image frame determined to be best suited for the requesting user's geographic location to be the thumbnail image. As an example and not by way of limitation, if the video is a sports highlight video, the thumbnail selection engine 320 may select a thumbnail image frame that includes an image of a team, player, etc., that is best suited for the requesting user's location, such as a representative image frame depicting a player that plays on the team that is locate closest to the requesting user's geographic location.

In particular embodiments, the thumbnail selection engine 320 may select the thumbnail image based on user preference data of the requesting user. As an example and not by way of limitation, the user preference data may indicate the requesting user's likes and/or dislikes, such as the requesting user's favorite or least favorite sports teams, actors/actresses, etc. In particular embodiments, the thumbnail selection engine 320 may select one of the representative image frames to be the thumbnail image that depict a sports team, actor/actress, etc., that the requesting user likes. In particular embodiments, the thumbnail selection engine 320 may be configured to avoid selecting representative image frames to be the thumbnail image that depict a sports team, actor/actress, etc., that the requesting user does not like.

In particular embodiments, the thumbnail selection engine 320 may select a representative image frame based on content that has been viewed by the requesting user. For example, the thumbnail request received from a client device may include data indicating the content, such as webpages, applications, etc., that were viewed by the requesting user. The thumbnail selection engine 320 may select one of the representative image frames that depict an image that relates to content viewed by the requesting user to be the thumbnail image. For example, if the requesting user was viewing applications and webpages related to guns and action, the thumbnail selection engine 320 may select a representative image frame that depicts action to be the thumbnail image.

In particular embodiments, the thumbnail selection engine 320 may select a representative image frame based on feedback received from users. As an example and not by way of limitation, the feedback engine 324 may be configured to receive feedback data regarding performance of the thumbnail images. As another example and not by way of limitation, the feedback data may indicate whether users selected to view a specified video based on the thumbnail image presented along with the user. In particular embodiments, the feedback engine 324 may store the feedback data in the date store 328, where it may be accessed by the other engines shown in diagram 300.

In particular embodiments, the feedback data may indicate the thumbnail image for a video that performed best (e.g., resulted in the most views by users). In particular embodiments, the feedback data may indicate the thumbnail image that performed best based on numerous factors, such as user demographic data, geographic location, time, etc. The thumbnail selection engine 320 may select a thumbnail image based on the feedback data and the user data for the requesting user. As an example and not by way of limitation, the thumbnail selection engine 320 may select the representative image frame that, based on the feedback data, has performed best (e.g., resulted in the most views or best conversion rate) to be the thumbnail image. In particular embodiments, thumbnail selection engine 320 may select the representative image that performed best overall or best based on a specified criteria related to the requesting user. As an example and not by way of limitation, the thumbnail selection engine 320 may select the representative image frame that performed best when served to users that match the requesting user's geographic location, demographic data, likes, etc., to be the thumbnail image.

In particular embodiments, the thumbnail selection engine 320 may select a representative image frame based on feedback data gathered from the requesting user. In particular embodiments, feedback data gathered from the requesting user may indicate the thumbnail images presented to the requesting user in the past, as well as whether the requesting user chose to view the corresponding video. In particular embodiments, the thumbnail selection engine 320 may select a representative image frame that is determined to be similar to thumbnail images that performed best with the requesting user to be the thumbnail image. As an example and not by way of limitation, if the feedback data indicates that the requesting user has a high conversion rate of selecting to view a video when presented with a thumbnail image depicting a female, the thumbnail selection engine 320 may select a representative image frame depicting a female as the thumbnail image.

In particular embodiments, the thumbnail selection engine 320 may select a thumbnail image based on host content associated with the thumbnail request. As an example and not by way of limitation, a thumbnail request may be associated with host content such as a website, webpage, application, application state, etc., that the thumbnail image will be presented within. The thumbnail request may include data identifying the host content and the thumbnail selection engine 320 may select a representative image to be the thumbnail image based on the host content. As another example and not by way of limitation, if the host content is a sports website, the thumbnail selection engine 320 may select a representative image frame that depicts sports to be the thumbnail image.

In particular embodiments, the thumbnail selection engine 320 may return the selected thumbnail image to the requesting user's client device in response to the thumbnail request. As an example and not by way of limitation, the client device may then present the returned thumbnail image along with the corresponding video. While the above examples discuss selection of a single thumbnail image, this is only one possible embodiment and is not meant to be limiting. In particular embodiments, the thumbnail selection engine 320 may select any number of thumbnail images for a video, which may be presented along with the corresponding video by the requesting client device.

In particular embodiments, the enhancement engine 322 may be configured to enhance image frames to increase the valence of the image frames. For example, the enhancement engine 322 may alter image frames to increase the valence of the image frame. For example, the enhancement engine 322 may apply filters to the image frames that alter the appearance of the image frame. The enhancement engine 322 may use any type of filter such as polarizing filters, neutral density filters, warming and cooling filters, enhancement filters, graduated color filters, special effect filters, etc.

The enhancement engine 322 may select a filter based on the content of the image frame. For example, some filters may be best suited for enhancing action images, while other filters may be best suited to enhance still or landscape images. Alternatively, the enhancement engine 322 may select a filter based on a brightness level of the image frame. For example, the enhancement engine 322 may select a filter to brighten an image frame if the brightness level of the image frame is determined to be below certain threshold brightness level. Alternatively, the enhancement engine 322 may select a filter to darken the image frame if the brightness level of the image frame is determined to meet or exceed a predetermined threshold brightness level.

In some embodiments, the enhancement engine 322 may select a filter based on the host content. For example, if the host content is dark, the enhancement engine 322 may select a filter to brighten the thumbnail image selected to be presented within the host content. Alternatively, if the host content is bright, the enhancement engine 322 may select a filter to darken the thumbnail image.

The enhancement engine 322 may enhance image frames prior to the image frames being transmitted to client devices. For example, after the thumbnail selection engine 320 has selected a representative image frame as a thumbnail image, the enhancement engine 322 may enhance the selected thumbnail image prior to the thumbnail image being transmitted to a client device.

Alternatively, the enhancement engine 322 may enhance image frames prior to the image frames being selected as thumbnail images. For example, the enhancement engine 322 may enhance image frames selected by the image frame selection engine 318 as representative image frames for a video. The enhanced image frames may be stored in the data store 328, where they may be selected as thumbnail images.

In addition to applying filters to an image, the enhancement engine 322 may also enhance image frames by cropping the image frames. For example, the enhancement engine 322 may crop image frames to remove portions of the image frame that are considered to be undesirable, such as portions that are unicolor, blurry, etc. Alternatively, the enhancement engine 322 may crop the image frames to center a primary focus of the image frame. For example, the enhancement engine 322 may crop an image frame to center an actor portrayed in the image frame.

In some embodiments, the enhancement engine 322 may crop an image frame to enhance a portion of the image frame determined to have a higher valence score. For example, the scoring engine 314 may calculate a separate valence score for different portions of an image frame and the enhancement engine 322 may crop an image frame to remove a portion of the image frame that received a lower valence score. Alternatively, the enhancement engine 322 may crop an image frame to center a portion of the image frame that received the highest valence score.

In some embodiments, the enhancement engine 322 may crop an image frame based on dimensions or an aspect ratio in which the image frame will be presented. For example, a thumbnail request may include data identifying specified dimensions or an aspect ratio in which a thumbnail image will be presented. The enhancement engine 322 may crop the selected thumbnail image to fit the specified dimensions or aspect ratio.

In some embodiments, the enhancement engine 322 may modify an image frame to add a text to the image frame. As an example and not by way of limitation, the enhancement engine 322 may modify an image frame to add a headline to a news story, a final score to a sports highlight, etc.

In particular embodiments, the valence engine 326 may be configured to generate the database of reference image frames. As an example and not by way of limitation, the valence engine 326 may be configured to receive a set of image frames and determine a valence score for the image frames to generate the database of reference image frames. In particular embodiments, valence engine 326 may receive the set of image frames from an administrator or other authorized user of the valence engine 326. As an example and not by way of limitation, an authorized user may upload or import the set of image frames, which may be stored in the data store 328. In particular embodiments, the valence engine 326 may gather the set of image frames, for example, by crawling and scraping content from the internet.

In particular embodiments, valence engine 326 may assign valence scores to the set of image frames to generate the representative set of image frames. In particular embodiments, the valence engine 326 may present the set of image frames to multiple users and prompt the users to provide valence scores for the set of image frames. As an example and not by way of limitation, the valence engine 326 may provide test users with a valence interface that presents each user of a group of test users the image frames from the set of image frames and enables the test users to enter a perceived valence score of the user for the presented image.

In particular embodiments, the valence engine 326 may enable users to select one or more portions of the image frames that the user likes or dislikes. As an example and not by way of limitation, the valence interface may enable a user to click or select a portion of an image frame and indicate whether the user likes or dislikes the specified portion of the image frame. In particular embodiments, the valence interface may enable a user to provide a valence score for the portions of the image frames in addition to an overall valence score for the image frame.

In particular embodiments, the valence engine 326 may use the valence scores received from the users to calculate the valence score for each image frame. As an example and not by way of limitation, the valence engine 326 may average the valence scores received from the users to calculate the valence scores. In particular embodiments, the valence engine 326 may take the mean of the valence scores received from the users to calculate the valences scores for the image frames.

In particular embodiments, the valence engine 326 may calculate valence score for portions of the image frames as well as an overall valence score for the image frame. As an example and not by way of limitation, the valence engine 326 may average the valence scores received from users for a specified portion of an image frame to calculate the valence score for the specified portion of the image frame.

In particular embodiments, the valence engine 326 may calculate the valence score for a portion of an image frame by increasing or decreasing the overall valence score of the image frame based on user input indicating whether they liked or disliked the portion of the image frame. As an example and not by way of limitation, if the overall valence score for an image frame is calculated to be 5, the valence engine 326 may calculate a valence score for a portion of the imager frame that users indicated that they did not like to be less than the overall valence score for the image frame, such as a valence score of 4. In particular embodiments, the valence engine 326 may calculate a valence score for a portion of the image frame that users indicated that they did like to be greater than the overall valence score for the image frame, such as a valence score of 6.

In particular embodiments, a group of test users may be paid to review the set of image frames and assign valence scores to the image frames. As a result, some of the test users may be interested only in receiving the payment and attempt to quickly select valence scores without providing meaningful feedback.

In particular embodiments, valence engine 326 may be configured to analyze the valence scores provided by a test user to determine whether the test user provided meaningful feedback or attempted to complete the process without providing meaningful feedback resulting in the provided valence scores being unreliable. As an example and not by way of limitation, the valence engine 326 may analyze the valence scores provided by the test users to identify repetitive patterns, such as assigning the same valence score or pattern of scores to the image frames, which may indicate that a test user did not provide meaningful insight and the provided valence scores are unreliable. As another example, the valence engine 326 may determine whether the valence scores provided by a test user are so inconsistent (e.g., an extreme outlier) from the valence scores provided by other test users that the valence scores may be unreliable.

In particular embodiments, the valence engine 326 may analyze the amount of time a test user spent assigning valence scores to the set of image frames to determine whether the valence scores are unreliable. As an example and not by way of limitation, test users that did not provide meaningful feedback may have provided valence score quickly without taking the time to analyze the image frames and provide meaningful feedback. Accordingly, the valence engine 326 may determine that valence scores provided by test users that spent less than a predetermined amount of time assigning the valence scores are unreliable.

In particular embodiments, the valence engine 326 may generate one or more sample sets of valence scores that mimic valence scores selected at random. In particular embodiments, the valence engine 326 may then compare the valence scores received from the test users to determine whether they closely match the randomly generated valence scores. If the valence score determines that the valence scores received from a user do closely match the randomly generated valence scores, the valence engine 326 may determine that the valence scores are unreliable.

Figure 4:
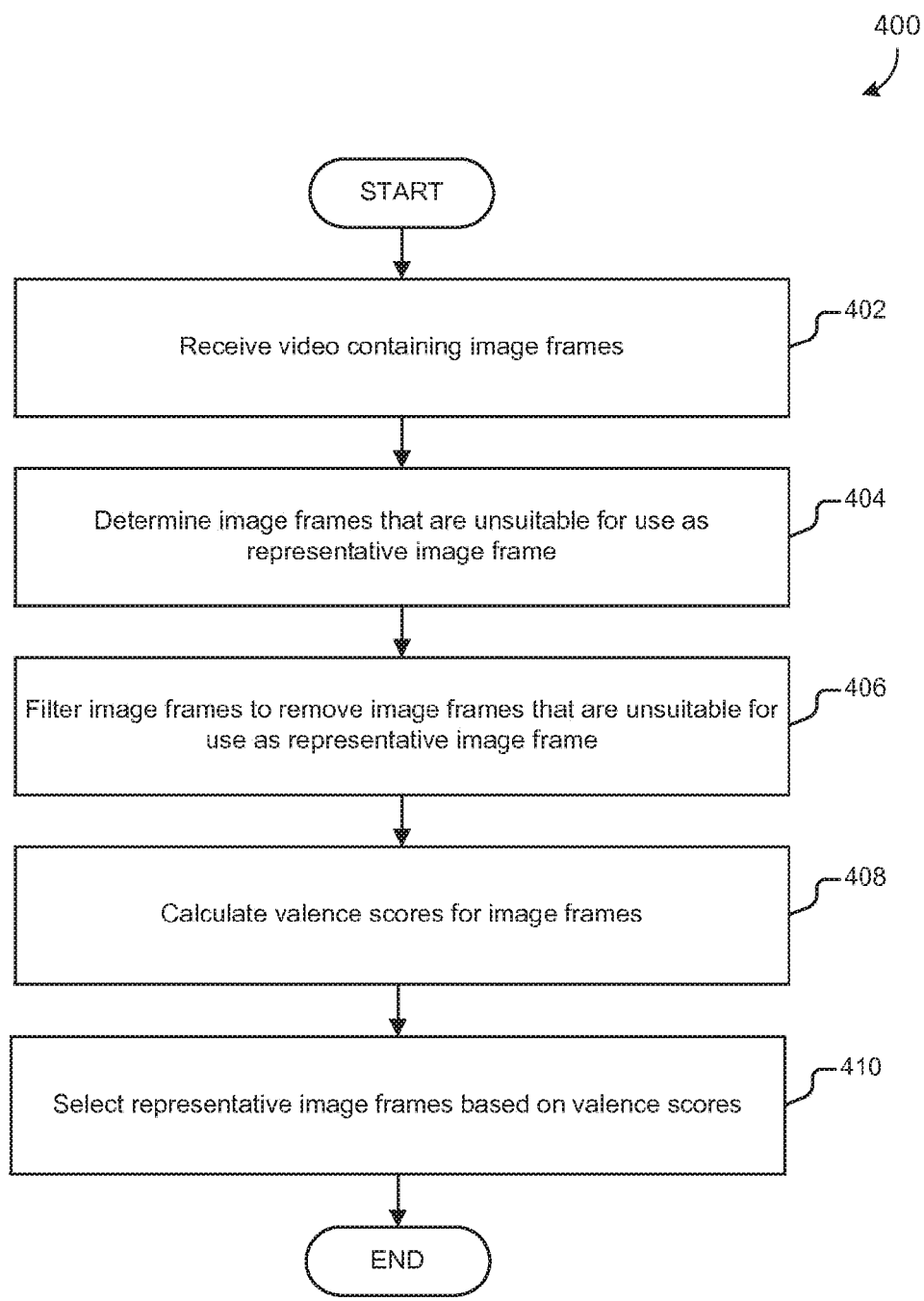
FIG. 4 depicts a flowchart of an example of a method for selecting high valence representative image.

FIG. 4 depicts an example method 400 for providing a high valence representative image. In the example of FIG. 4, the method begins at step 402 with receiving a video containing image frames. In particular embodiments, a video may be any collection of image frames, such a movie, video clip, image album, live video feed, etc. In particular embodiments, the video may be received along with a representative image frame request and may include receiving the video and/or an identifier identifying the video. The received video may be downloaded or otherwise accessed from a video distribution platform.

In the example of FIG. 4, the method 400 continues to step 404 with determining that image frames that are unsuitable for use as a representative image frame for the video. As an example and not by way of limitation, the image frames of the video may be analyzed to identify image frames that are blurry, unicolor or contain too much text to be suitable as a representative image frame for the video.

In the example of FIG. 4, the method 400 continues to step 406 with filtering the image frames to remove the image frames that are unsuitable for use as representative image frames. As an example and not by way of limitation, image frames that are blurry, unicolor or contain too much text may be removed from the image frames of the video. This may result in a filtered set of image frames for the video that does not contain image frames that were determined to be unsuitable for use as a representative image frame for the video. Filtering the image frames to remove image frames that are unsuitable for use as a representative image frame may reduce resource usage and/or time spent to select representative image frames for the video.

In the example of FIG. 4, the method 400 continues to step 408 with calculating valence scores for the image frames. In particular embodiments, a valence score may represent an estimated intrinsic attractiveness (positive valence) or unattractiveness (negative valence) of an image frame. In particular embodiments, the valence scores for the image frames may be calculated using a database of reference image frames that have known valence score values. As an example and not by way of limitation, the reference image frames from the database of reference image frames may be analyzed to a set of the similar reference image frames that are determined to be visually similar to each image frame. The valence score for each image frame may be calculated based on the valence scores of the set of similar reference image frames.

In the example of FIG. 4, the method 400 continues to step 410 with selecting representative image frames for the video based on the valence scores. As an example and not by way of limitation, a predetermined number of image frames that have the highest valence scores, such as the top 5 image frames based on valence scores, may be selected as the representative image frames. In particular embodiments, the image frames that have a valence score above a specified threshold value may be selected as the representative image frames for the video. In particular embodiments, the representative image frames may be used as thumbnail images to be presented along with the video.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
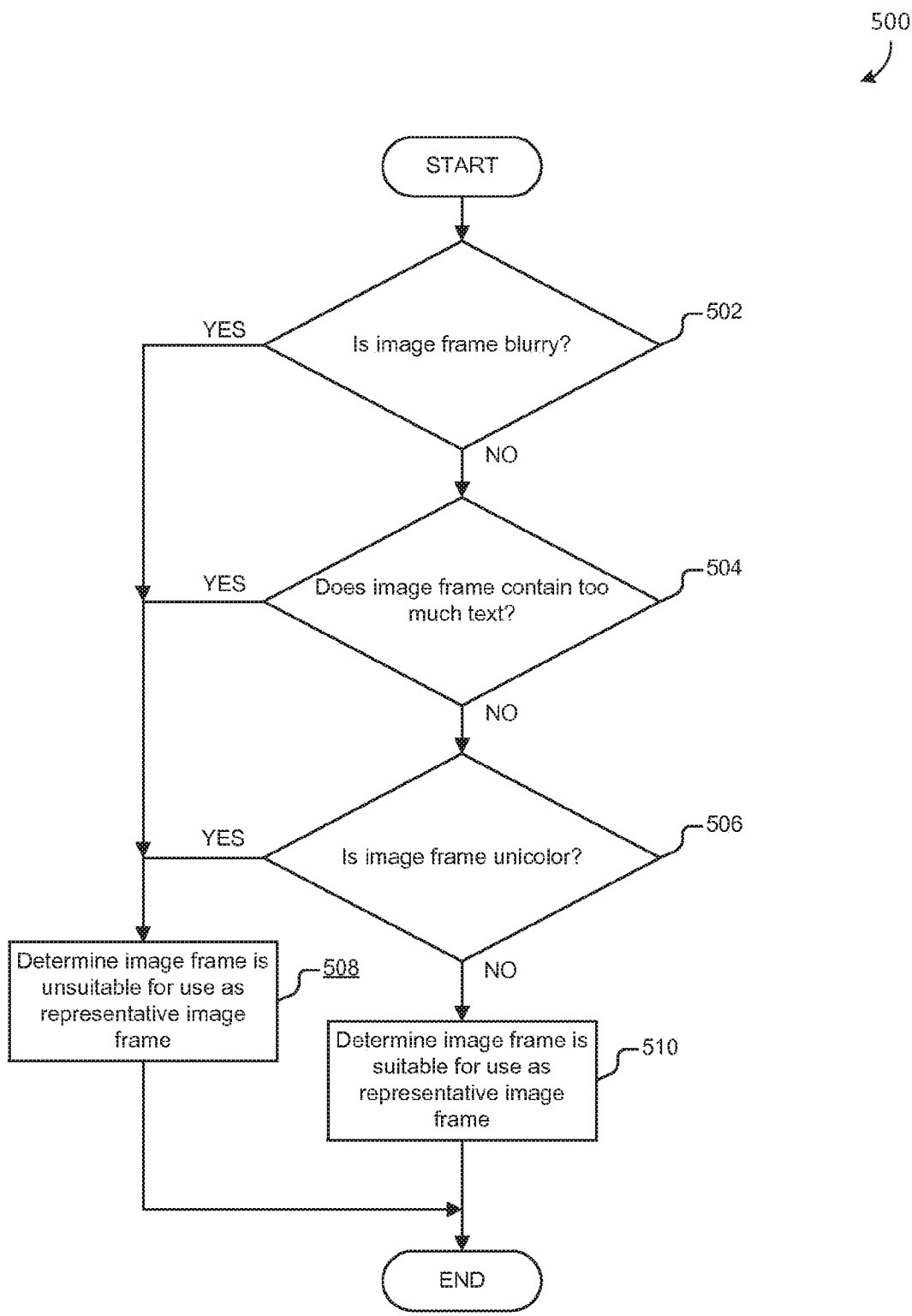
FIG. 5 depicts a flowchart of an example of a method for determining that an image frame is unsuitable for use as a representative image frame.

FIG. 5 depicts an example method 500 for determining that an image frame is unsuitable for use as a representative image frame. In the example of FIG. 5, the method 500 begins with step 502 with determining whether an image frame is blurry. As an example and not by way of limitation, a blurriness level of the image frame may be determined and compared to an acceptable blurriness threshold level. In particular embodiments, if the blurriness level of the image frame meets or exceeds an acceptable blurriness threshold level, it may be determined that the image frame is blurry. In particular embodiments, if the blurriness level of the image frame does not meet or exceed the acceptable blurriness threshold level, it may be determined that the image frame is not blurry.

In the example of FIG. 5, if it is determined that the image frame is blurry, the method 500 continues to step 504 with determining that the image frame is unsuitable for use as a representative image frame for the video. In particular embodiments, in the example of FIG. 5, if it is determined that the image frame is not blurry, the flowchart 500 continues to module 504 with determining whether the image frame contains too much text. As an example and not by way of limitation, an amount of text included in the image frame may be determined and then compared to an acceptable threshold amount of text. In particular embodiments, if the amount of text included in the image frame meets or exceeds the acceptable threshold amount of text, it may be determined that the image frame contains too much text. In particular embodiments, if the amount of text included in the image frame does not meet or exceed the acceptable threshold amount of text, it may be determined that the image frames does not contain too much text.

In the example of FIG. 5, if it is determined that the image frame includes too much text, the method 500 continues to step 508 where the image frame is determined to be unsuitable for use as a representative image frame for the video.

In the example, of FIG. 5, if it is determined that the image frame does not include too much text, the method 500 continues to step 506 with determining whether the image frame is unicolor. In particular embodiments, a unicolor image frame may be an image frame that depicts a substantial portion of image that is one color or within a predetermined range of one color. In particular embodiments, to determine whether an image frame is unicolor, a unicolor level of the image frame may be determined and compared to an acceptable unicolor threshold level. In particular embodiments, the unicolor level of the image frame may indicate the largest portion or percentage of the image frame that is unicolor (e.g., the same color or within a predetermined range of one color). In particular embodiments, the acceptable unicolor threshold level may indicate a percentage or portion or portion of the image frame that may be unicolor (e.g., the same color or within a predetermined range of one color). If the unicolor level of the image frame meets or exceeds the acceptable unicolor threshold level, it may be determined that the image frame is unicolor. If the unicolor level of the image frame does not meet or exceed the acceptable unicolor threshold level, it may be determined that the image frame is not unicolor.

In the example of FIG. 5, if it is determined that the image frame is unicolor, the method 500 continues to step 508 where the image frame is determined to be unsuitable for use as a representative image frame for the video.

In the example, of FIG. 5, if it is determined that the image frame is not unicolor, the method 500 continues to step 510 with determining that the image frame is suitable for use as a representative image frame for the video.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
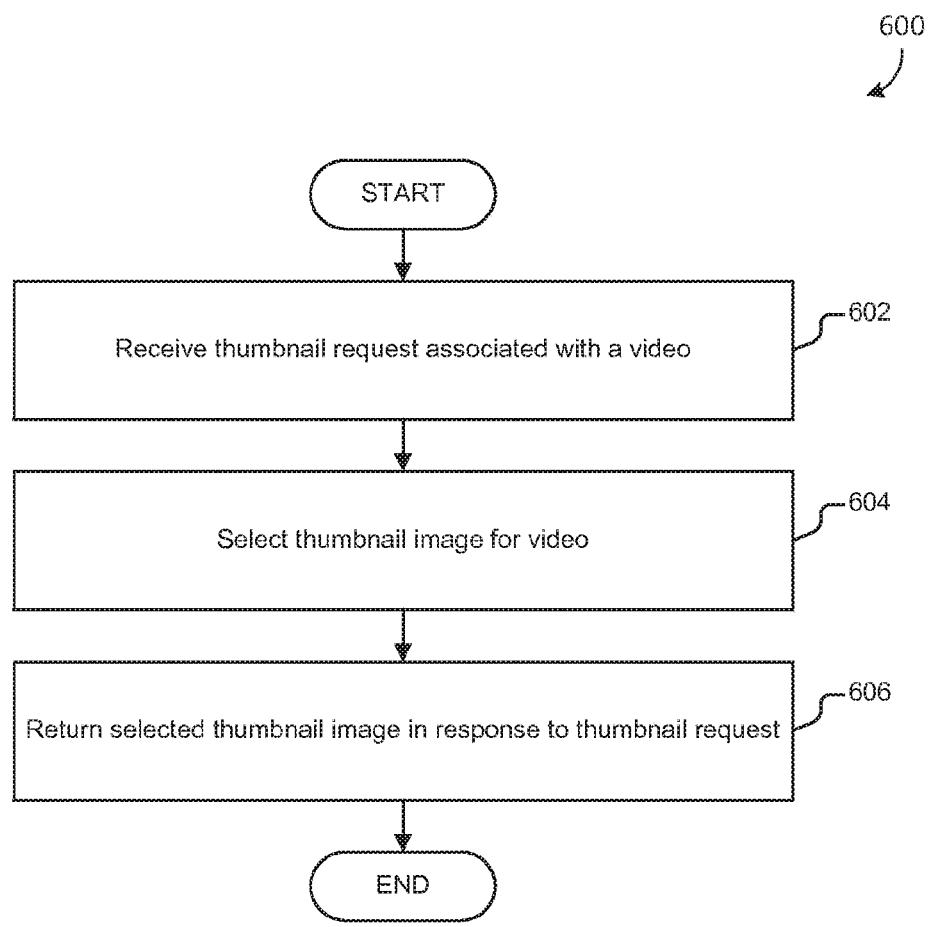
FIG. 6 depicts a flowchart of an example of a method for providing a thumbnail image for a video.

FIG. 6 depicts an example method 600 for providing a thumbnail image for a video. In the example of FIG. 6, the method 600 begins at step 602 with receiving a thumbnail request associated with a video. As an example and not by way of limitation, a thumbnail request may be a request received from a client device for a thumbnail image to be presented along with a specified video.

In the example of FIG. 6, the method 600 continues to step 604 with selecting a thumbnail image for the video. As an example and not by way of limitation, one of the representative image frames for the video may be selected to be the thumbnail image for the video. The thumbnail image may be selected in numerous ways. As another example and not by way of limitation, the thumbnail image may be selected based on the valence scores of the representative image frames, such as selecting the representative image frame with the highest valence score. In particular embodiments, the thumbnail image may be selected from the representative image frames according to a set order.

In particular embodiments, a thumbnail image may be selected based on user data regarding the requesting user and/or market segmentation parameters. As an example and not by way of limitation, user data may include the user's likes, dislikes, preferences, geographic location, demographic data, etc. Market segmentation parameters may include geographic, demographic, psychographic, behavioristic, and/or other data about one or more market segments predicted or accepted to be of use in selecting an appealing high valence representative image for presentation to a member of the market segment. In particular embodiments, the thumbnail image may be selected based on the requesting user's recent activity, such as the content (e.g., applications, websites, etc.) that the requesting user recently accessed.

In particular embodiments, the thumbnail image may be selected based on feedback data gathered from the requesting user and/or other users. As an example and not by way of limitation, the feedback data may indicate user actions when presented with different thumbnail images for a video. As another example, the feedback data may indicate the conversion rate (e.g., the rate at which users selected to view the corresponding video) when presented with various thumbnail images for a video. In particular embodiments, the feedback data may be used to select a representative image frame that performed best (e.g., had the highest conversion rate) to be the thumbnail image. This may include selecting the representative image frame that performed best overall and/or the best when presented under similar circumstances (e.g., presented to similar users, at similar time, on similar host content, etc.)

In the example of FIG. 6, the method 600 continues to step 606 with returning the selected thumbnail image in response to the thumbnail request. In particular embodiments, this may include transmitting the selected thumbnail image to the requesting user's client device, where it may be presented along with the corresponding video (e.g., along with a link, application, etc., that enables the requesting user to view the corresponding video).

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
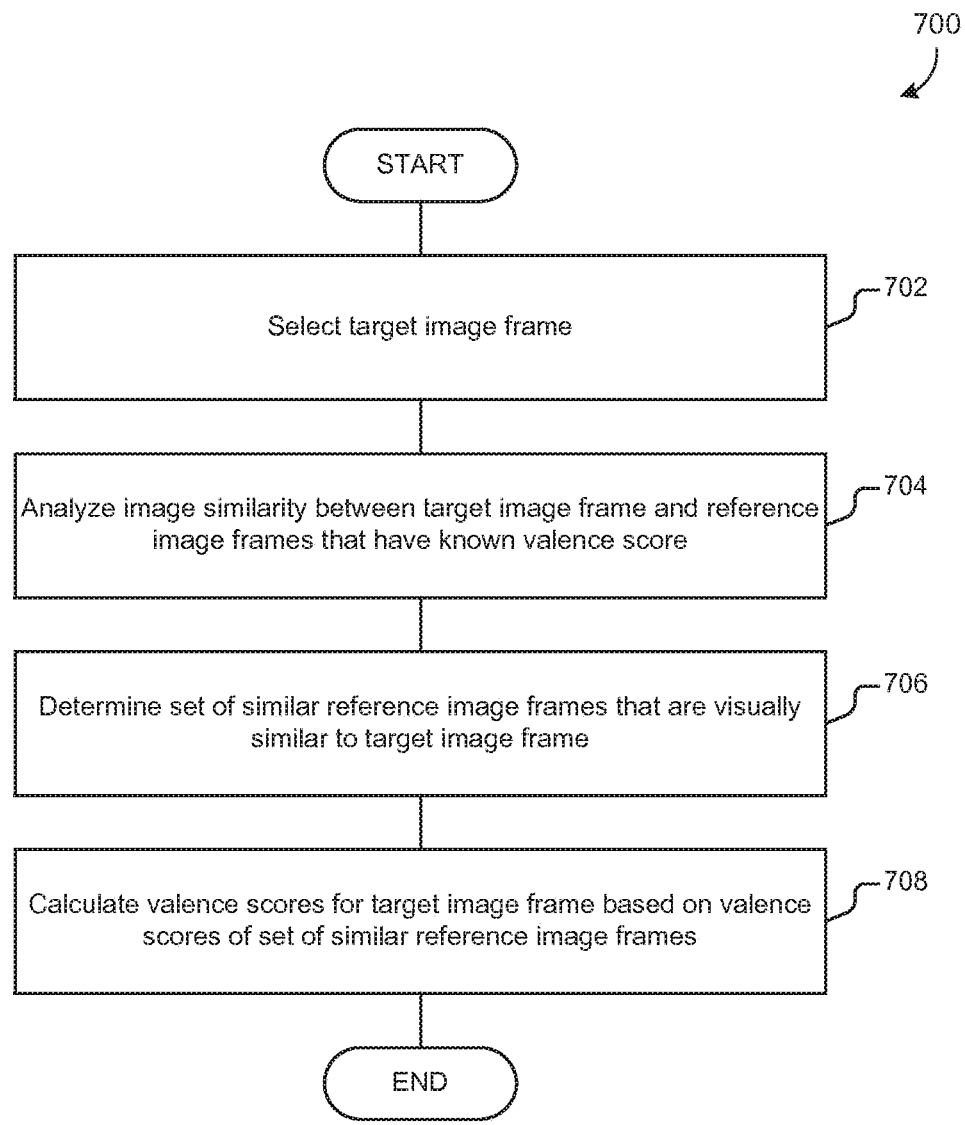
FIG. 7 depicts a flowchart of an example method for calculating valence scores for image frames.

FIG. 7 depicts an example method 700 for calculating valence scores for image frames. In the example of FIG. 7, the method 700 starts at step 702 with selecting a target image frame. In particular embodiments, a target image frame may be an image frame selected from a set of image frames, such as image frames from a video. In particular embodiments, a target image frame may be selected to have a valence score calculated for the target image frame. As an example and not by way of limitation, the target image frame may be an image frame for which a valence score has not been calculated. As another example the target image frame may be selected at random from the set of image frames. In particular embodiments, the target image frame may be selected in a set order such as the order in which the image frames are positioned within the video.

In the example of FIG. 7, the method 700 continues to step 704 with analyzing image similarity between the target image frame and reference image frames that have a known valence score. In particular embodiments, analyzing image similarity between the target image frame and a reference image frame may include determining how similar the target image frame is to a reference image frame. As an example and not by way of limitation, similarity may be based on an analysis of the images depicted, colors, actions, etc. The analyzing may also include calculating similarity scores for the reference image frames that indicate how similar the reference image frames are to the target image frame.

In the example of FIG. 7, the method 700 continues to step 706 with determining a set of similar reference image frames that are visually similar to the target image frame. In particular embodiments, the set of similar reference image frames may be determined based on the similarity scores for the set of reference image frames. As another example, a predetermined number of the reference image frames with the highest similarity score may be determined to be the set of similar reference image frames, such as the top ten reference image frames based on similarity score. In particular embodiments, the reference image frames that have a similarity score that meets or exceeds a predetermined threshold similarity score may be determined to be the set of similar reference image frames.

In the example of FIG. 7, the method 700 continues to step 708 with calculating valence scores for the target image frame based on the valence scores of the set of similar reference image frames. As an example and not by way of limitation, the valence score of the target image frame may be calculated by averaging the valence scores of the set of similar reference image frames. As another example, the valence score of the target image frame may be the mean of the valence scores of the set of similar reference image frames.

In particular embodiments, the database of reference image frames may be based on a deep neural network trained to images labeled and viewed by individual users. As an example and not by way of limitation, a database of reference images may be created by showing a plurality of images to individuals and asking the individuals to select one of the images. The responses may be received as input data for features of the selected images as being more likely to elicit a response from users compared to the other displayed images. As an example and not by way of limitation, an individual may be asked to pick one image from a displayed set of four images, and this process may be repeated hundreds or thousands of times. A number of features (or "dimensions") for each image may be determined. As an example and not by way of limitation, dimensions may include: the color of an image, such as an average color value for the image or a variance in color values; whether faces or people are depicted, and if so, their location, relative size, or orientation in the image; whether any depicted objects are in motion; contrast and blur values; or any other suitable feature that may be determined from the image data.

In particular embodiments, based on the individual inputs, a prediction of what features or dimensions may elicit stronger responses in users may be determined. When a new image is analyzed for valence, the new image may be compared to a reference image that is similar to the new image. It may be assumed that the new image will have a valence similar to that of the reference image. In particular embodiments, the deep neural network may adjust one or more features or determination of image similarity based on future user input. As an example and not by way of limitation, if image-selection system 108 presents a new image to users based on how users reacted to a reference image, and users subsequently interact with the new image differently, image-selection system 108 may determine that either the new image should not be considered similar to the reference image, or that the valence score of the reference image may need to be adjusted.

In particular embodiments, multiple valence scores may be calculated for a single image, based on demographic information about a particular user viewing the image. As an example and not by way of limitation, a particular image may evoke different types or levels of responsiveness from users that differ in age, gender, nationality, city/state of residence, education level, or any other conceivable demographic information. In particular embodiments, when a particular user requests one or more thumbnail images for viewing, the demographic information of the particular user may be accessed in order to calculate valence scores based on the same demographic categories as the particular user.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
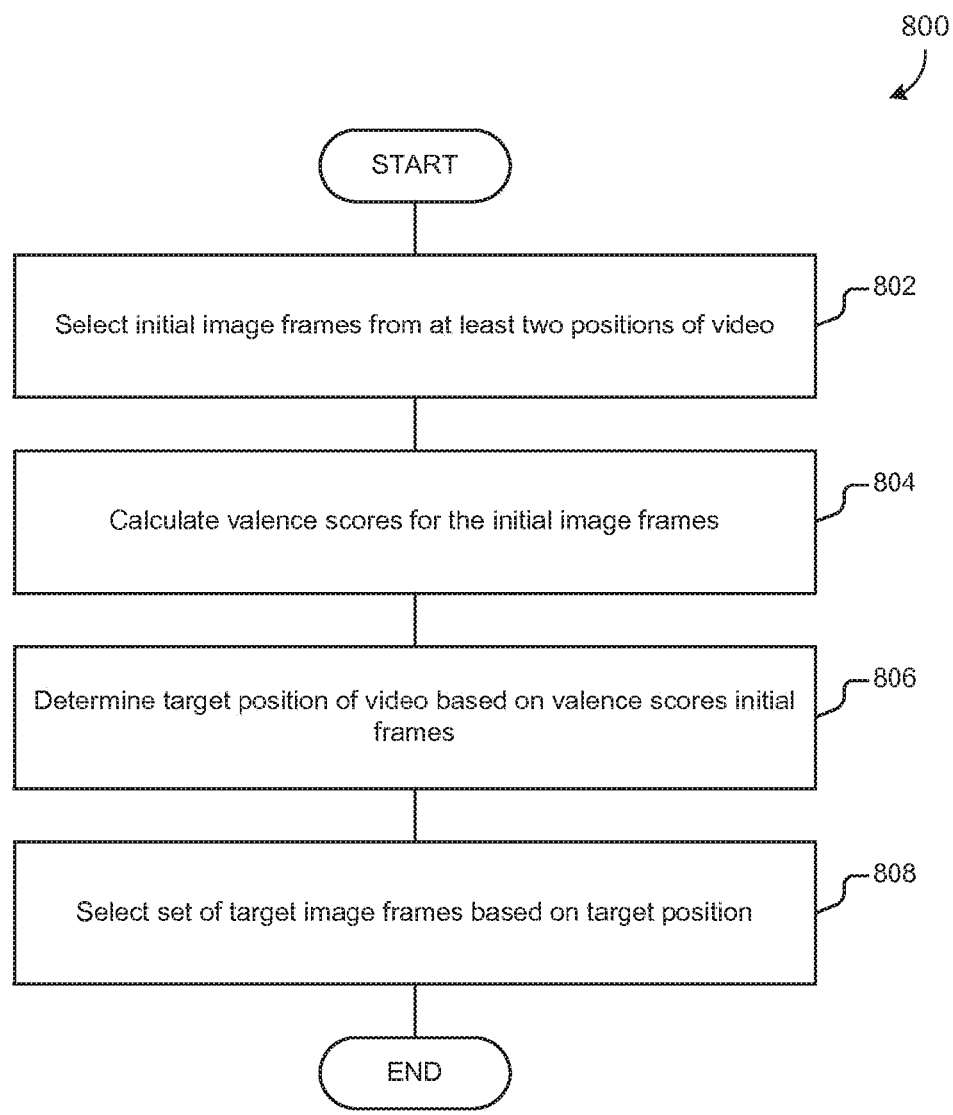
FIG. 8 depicts a flowchart of an example method for selecting target image frames from a video.

FIG. 8 depicts an example method 800 for selecting target image frames from a video. In the example of FIG. 8, the method 800 starts at step 802 with selecting initial image frames from at least two positions of the video. In particular embodiments, a position of the video may be a relative position of the video at which image frames are presented, such as the beginning, middle, end, etc., of the video. As another example, the initial image frames may be selected from different positions of the video to provide a sample of initial image frames that are distributed along the entire length of the video. As another example and not by way of limitation, initial image frames may be selected from the beginning, middle and end of the video.

In the example of FIG. 8, the method continues to step 804 with calculating valence scores for the initial image frames. As an example and not by way of limitation, the valence scores may be calculated based on a set of reference image frames that have known valence scores.

In the example of FIG. 8, the method continues to step 806 with determining target positions of the video based on the valence scores of the initial image frames. In particular embodiments, a target position may indicate a position of the video predicted to contain image frames with high valence scores. As an example and not by way of limitation, the target position may be determined based on the position of the initial image frame with the highest valence scores. As another example, the target position may be determined based on the position of two initial frames with the highest valence scores. As an example and not by way of limitation, the target position may be located between the positions of the two initial frames with the highest valence scores.

In the example of FIG. 8, the method continues to step 808 with selecting a set of target image frames based on the target position. As an example and not by way of limitation, the set of target image frames may be selected from the target position and/or within a predetermined distance from the target position of the video. As another example, if the target position is a point in the middle of a video, the target image frames may be selected from a point in the middle of the video and/or within a predetermined distance of the point in the middle of the video.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Iterative Searches

In particular embodiments, selection of a high-valence representative image (e.g. image to be used as a "thumbnail") may be performed by analyzing the valence score of a set of images consecutively. As an example and not by way of limitation, in a set of 1,000 images (such as a video clip), image-selection system 108 may determine the valence score for the first image, then the second image, etc. until all 1,000 images may be analyzed. In particular embodiments, serial analysis in the manner described above may be inefficient in terms of the computational resources required or time expended compared to the relative benefits of analyzing every image. In particular embodiments, image-selection system 108 may take a sample of the total set of images, determine valences scores for the sample images, then narrow down the search for images by focusing on regions of the set likely to have high-valence images. As used herein, a region may refer to a plurality of images comprising a segment of a video. As an example and not by way of limitation, a video clip may be divided into a plurality of video segments, e.g. subclips of a video clip, or subsets of a set of images. In particular embodiments, each region may be considered a "local region." In particular embodiments, any analysis of the images or frames within the local region may be done only within the context of the frames or images in the local region, rather than the video or set of images as a whole. In particular embodiments, the search may be performed iteratively, where each successive search is based on the valence scores determined in the previously-searched images. Once a local region of the set is identified, image-selection system 108 may determine the best image from the region. As an example and not by way of limitation, if image-selection system 108 takes eight sample images out of a total set of 1,000, wherein the eight are evenly distributed throughout the set, and measures the valence scores for the eight images, image-selection system 108 may determine that the region between the fourth and fifth sample images are likely to have a higher valence score based on the valence scores of the fourth and fifth sample images, and will take further samples from that region. In particular embodiments, image-selection system 108 may use an iterative process to determine further valence scores for images in the set, wherein the selection of an image for sampling is based on the valence scores previously determined for other images in the set. In particular embodiments, image-selection system 108 may use any method of predicting values to estimate regions of high valence scores.

In particular embodiments, image-selection system 108 may pre-filter the set of images to ensure that valence scores are only calculated for images whose content is adequate for use as a thumbnail. As an example and not by way of limitation, image-selection system 108 may eliminate from initial considerations any images that are too blurry, have too much text, are part of a scene transition, or are too unicolor (such as a title card). In particular embodiments, for each characteristic of a particular image, image-selection system 108 may determine a score for that characteristic for that image. As an example and not by way of limitation, image-selection system 108 may determine a blurriness score for an image based on a degree of blurriness of the objects depicted in the image. In particular embodiments, blurriness may be determined based on edge detection methods. If the score for the image is above a predetermined threshold score, the image may be determined to be too blurry, and excluded from the search. As another example, image-selection system 108 may determine a text score for an image based on the amount of text shown in the image. The text score may be based on any text detection or recognition method, and may be dependent on a number of text characters shown, or the proportion of the total image area that is text. If the text score exceeds a threshold value, image-selection system 108 may exclude that image from the iterative search. In particular embodiments, image-selection system 108 may determine whether there are any faces depicted in a particular image, and if so, whether the faces and/or eyes are visible. As an example and not by way of limitation, a particular image may depict a person's face, but the person may have turned away from the camera so that their features are hidden from view (or are blurry), or they may have their eyes closed. Image-selection system 108 may determine that such depictions are less useful to a user or will have a lower valence score, and will exclude that image from consideration.

In particular embodiments, the search for a high-valence representative image may be conducted via an iterative search process to identify the best image in a plurality of local regions of the image set, in order to produce a subset of high-valence images that are not too similar to each other. Determining a set of high-valences images that are not too similar to each other may provide a variety of images, which may be more useful for a thumbnail representation. In particular embodiments, for a particular video, there may be one sequence of video frames that have the highest valence score in the video. Simply selecting the best ten frames for this video may result in ten consecutive frames from the high-valence segment being selected. However, there would then be no need for multiple images to be selected, since all ten may depict the same scene. Ensuring that image-selection system 108 selects different images may ensure that a plurality of different images may be sent to users, which may further enable image-selection system 108 to differentiate between images based on subsequent user responses. As an example and not by way of limitation, if image-selection system determines a set of two high-valence images to present to a user, wherein the two selected images are different along particular characteristics, and the user subsequently clicks on one of the selected images, image-selection system 108 may use the user-input to determine what characteristics (and what values for those characteristics) may be more valuable to the user or for the particular video, and may adjust any valence-score calculation with respect to the user, the particular set of images, or to a particular genre of images to send to users.

In particular embodiments, an iterative search process may be used by image-selection system 108 in order to efficiently reach a set of useful thumbnail images that represent the set of images or video. The number of iterative steps or number of images analyzed may be adjusted depending on a preference of a user or of image-selection system 108. As an example and not by way of limitation, if there is an increased priority on creating thumbnail images as quickly as possible, then image-selection system 108 may select its thumbnail high-valence images after only a few iterative steps, to ensure that fewer processing steps are necessary. As another example, if the user preference or the preference of image-selection system 108 is to find the optimal set of thumbnail images, then image-selection system 108 may perform a larger number of iterations until it is certain that the set of images it has is most representative and will likely invoke a reaction from the viewer. In particular embodiments, image-selection system 108 may be instructed to stop at any time while it is doing an iterative search, and image-selection system 108 may provide its set of thumbnail images as determined at that time. As an example and not by way of limitation, an image-selection system 108 may be instructed to analyze a video and find the best four images representing the video. Image-selection system 108 may determine that frames A, B, C, and D are the best after completing the iterative search process. Continuing this example, a user may stop the iterative search process after ten seconds. This could be due to a bias in favor of increased speed in obtaining the thumbnail images over losing a slight degree of accuracy. In this example, when the user stops image-selection system 108, the best four images may be A, B, C, and E, because image-selection system 108 has not yet reached frame D. In particular embodiments, the user may consider that frame E is almost as good as frame D, and opt to emphasize speed rather than waiting for image-selection system 108 to find the most optimal solution. In particular embodiments, the balance between speed and optimization may depend on the circumstances of the iterative search. As an example and not by way of limitation, if the set of images is a live video stream and users are requesting thumbnails as the live stream is being broadcast, speed may be more important, and image-selection system 108 may perform fewer iterative steps. As another example, if the set of images is a recorded video to be released days or weeks in the future, and image-selection system 108 is being used now to create thumbnail images for the video link, speed is less important, and image-selection system 108 may perform more iterative steps or perform other analyses to ensure that the selected thumbnail images are best for the situation.

In particular embodiments, image-selection system 108 may use prediction algorithms to improve the search process for a high-valence image. As an example and not by way of limitation, the selection may utilize a Metropolis-Hastings algorithm to refine the search of the set of images. In particular embodiments, the selection of high-valence images may be performed by sampling one or more frames of a video, determining valence scores for those frames, then determining another set of one or more frames to sample. In particular embodiments, the sampling may be an iterative process, with image-selection system 108 determining valence scores for a current sample frame, selecting one or more other frames for analysis based at least in part on the valence score of the current frame, and repeating the process. In particular embodiments, image-selection system 108 may record information associated with a plurality of frames corresponding to a very high or very low valence score. As an example and not by way of limitation, as the image sampling is performed, image-selection system 108 may maintain a list of eight frames with the highest valence scores. If a new frame is analyzed with a higher valence score than one or more frames in the list, the new frame may replace the frame in the list with the lowest score. In particular embodiments, this iterative process may be stopped at any point in the sampling, and image-selection system 108 may return one or more selected frames analyzed so far in the sampling.

In particular embodiments, the iterative sampling process may further rely on audio associated with the set of images. As an example and not by way of limitation, the set of images may be a video clip with associated audio data. Image-selection system 108 may utilize the audio data in parallel with the video. As an example and not by way of limitation, a sudden change in the audio may indicate that a significant event is occurring. As one example, if the video clip is a baseball game, a sudden change in audio may correspond to the bat striking the ball, a sudden change in volume of the announcer's voice (which may be indicative of an exciting event), or a sudden change in volume of crowd noise (which may also indicate that something exciting has occurred). In particular embodiments, audio data may be used by image-selection system 108 to determine sample frames. Continuing the example above, image-selection system 108 may determine that there was a sudden shift in audio in frame 2,500 of a 10,000-frame video clip; subsequently, image-selection system 108 may take one or more sample frames from around frame 2,500 to determine if there is a region of high-valence score images nearby.

In particular embodiments, a graphical processing unit (GPU) may be used to sample the frames of the video. In particular embodiments, it may be more efficient to sample a plurality of frames at a time, then select another plurality for further sampling, rather than sampling one frame at a time. As an example and not by way of limitation, image-selection system 108 may sample eight frames from a video clip concurrently. In particular embodiments, the eight frames may be randomly selected from the original set of images. In particular embodiments, image-selection system 108 may divide the set of images into eight equal sections, and select a frame from each section for sampling. Image-selection system 108 may subsequently choose eight additional frames to analyze, based on the valence scores for the first eight frames selected. As an example and not by way of limitation, image-selection system 108 may determine a first sample of images A, B, C, D, E, F, G, and H. The valence scores calculated for these images may show that frames A, C, and D have a high valence score, while the remaining frames have relatively lower valence scores. Image-selection system 108 may then select eight new frames for selection. In particular embodiments, image-selection system 108 may randomly select a new set of frames. In particular embodiments, image-selection system 108 may select a set of frames likely to have higher valence scores. Continuing the example above, image-selection system 108 may select eight new frames around frames A, C, and D, without selecting any new frames around frames E, F, G, or H.

In particular embodiments, image-selection system 108 may determine a "region" in the set of images likely to have a high-valence image, based on the iterative sampling discussed above. As an example and not by way of limitation, from a starting set of 1000 images, image-selection system 108 may determine a region of twenty images that will likely have a high valence score. In particular embodiments, the region of images may be consecutive images in the set. In particular embodiments, the region of images may comprise a video segment. In particular embodiments, the region of images may be consecutive images, with the exclusion of images that were previously filtered out. In particular embodiments, the determination of the region of images may be performed based on known valence scores of sampled images within the region. As another example, determination of the region may be based on known valence scores of images near the region, and the Metropolis-Hastings algorithm (or any other suitable algorithm) may predict that the region has a higher valence score. In particular embodiments, image-selection system 108 may determine the valence scores for each image in the region, in order to select the image having a local maximum. While each of the images in the region may have a high valence score compared to the rest of the set of images, there may be variation within the region. As an example and not by way of limitation, for a set of consecutive images, there may be a flaw in one or more images (e.g. a person's eyes are closed) that are resolved in other images in the set (e.g. the person has opened their eyes at this point).

In particular embodiments, once a local region is identified, image-selection system 108 may determine the "best" image from the local region. In particular embodiments, the best image from the local region may be the image with a local maximum or minimum in terms of valence. In particular embodiments, once the high-valence local region is identified, image-selection system 108 may look at a number of features within the images of the local region to determine the particular image that is highest-scoring along those features. In particular embodiments, determination of the best image may not depend on the valence scores. As an example and not by way of limitation, once image-selection system 108 has determined that a particular local region has high valence, it may be assumed that all images in that local regions will have a higher valence than most images in the overall set. Therefore, image-selection system 108 will look for additional features of the images which may maximize the quality of the selected image or improve the experience of the user viewing that image.

In particular embodiments, the local region may also be sampled by image-selection system 108 to find the best image. As an example and not by way of limitation, if the local region comprises 64 images, image-selection system 108 may sample every eighth image. In particular embodiments, selection of the best image may comprise filtering the images in the local region, then calculating feature scores for each image.

In particular embodiments, image-selection system 108 may perform a filtering step on the samples to limit the set of candidate images further, based on characteristics of the local region. As an example and not by way of limitation, image-selection system 108 may determine whether there is a low or a high pixel variance between the sampled images. Too high of a pixel variance may indicate that there is a scene transition, and images around that transition may not be considered. If there is too low of a pixel variance, that may indicate that there is little to no action occurring in those images. In particular embodiments, image-selection system 108 may determine whether any faces can be detected in the sampled images. If there are detected faces, image-selection system 108 may exclude images that do not have any faces, or reduce the corresponding feature scores. In particular embodiments, image-selection system 108 may select images with the most detected faces, or raise the corresponding feature scores so that it is more likely that the image with the most faces will be determined the best image in the region.

In particular embodiments, feature scores may be calculated based on a plurality of features of an image. In particular embodiments, a feature score may look at characteristics of features of an image in a manner similar to a valence score. In particular embodiments, some features considered for the feature score may not be used to calculate the valence score, and some features considered in a valence score may not be used to calculate the feature score. In particular embodiments, image-selection system 108 may determine individual scores for each feature considered for a feature score. As an example and not by way of limitation, for a particular image, image-selection system 108 may consider individual scores for any facial expression depicted; text appearing in the image; any blur in the image; detected motion of objects in the image; a vibrance of the image; or detected action in the image. In particular embodiments, the individual scores for each feature may be combined linearly to determine a feature score. In particular embodiments, the weights of each individual score in the linear combination may be based on features that are significantly different from other images in the set of images. As an example and not by way of limitation, a set of images may be a video clip of a movie having very few action scenes, and the local region being analyzed may be the main action scene in the film. Image-selection system 108 may place a greater weight on the individual score for the action in a given image when calculating feature scores for this local region, so that the best image in this region is likely to be the most "action-y" image.

In particular embodiments, image-selection system 108 may determine a plurality of best images corresponding to a plurality of local regions. As an example and not by way of limitation, the iterative search process may yield a plurality of high-valence local regions. Image-selection system 108 may analyze each of the local regions, selecting one image from each local region as the best image. From the set of best images, image-selection system 108 may select a subset of images to send to users, based on the respective valence scores for each best image. In particular embodiments, image-selection system 108 may determine whether two or more of the best images are too similar to each other, and filter out duplicate or near-duplicate images. As an example and not by way of limitation, a set of images being analyzed may be a video clip of a broadcast of a soccer game where only one goal was scored. Throughout the game, replays of the goal may be shown. Image-selection system 108 may determine during the iterative search process that each instance of the goal being depicted is a high-valence local region, as well as other local regions (e.g. other plays during the game such as a near-miss shot). Image-selection system 108 may select a best image from each local region corresponding to the goal, but then determine that these images are too similar. In particular embodiments, the similarity may be based on the shot composition, associated audio, the faces or text depicted in the image, or any other method of determining that two images correlate to the same event or scene. In this example, even if all of the best images from the local regions corresponding to the goal have a higher valence score than all other selected images, image-selection system 108 may exclude all but one image of the goal from the final selection of images. In particular embodiments, comparison of the local regions may provide two images that are not similar, even though they are depicting the same event. Continuing the example above, one image may depict a close-up of the player kicking the shot leading to the goal, while a second image depicts the goalkeeper attempting a save as the ball goes in the goal. Image-selection system 108 may determine that these two images are not similar, and include both images in the final selection.

In particular embodiments, image-selection system 108 may determine whether a particular image should be added to the group of thumbnail images to be used. As an example and not by way of limitation, image-selection system 108 may have already determined eight high-valence thumbnail images (A-H) for use, but determine that another local region must be analyzed to find a best image within the local region. This analysis may result in another high-valence thumbnail image (I) for potential use. In particular embodiments, image-selection system 108 may determine whether to discard the new thumbnail image (I) and proceed with the original eight (A-H) images, or discard one image of the original eight thumbnail images and add the new thumbnail (I) to the group. In particular embodiments, image-selection system 108 may determine a similarity score between the new thumbnail image and each of the eight thumbnail images (e.g. the similarity between I-A, I-B, I-C, etc.), as well as similarity scores for each of the eight thumbnail images with respect to each other (e.g. the similarity between A-B, A-C, . . . B-C, B-D, . . . ). Image-selection system 108 may determine whether any of the similarity scores involving the new image (I) is higher (indicating greater similarity) than any similarity scores between the original images (A-H). If a particular similarity score including image I is the highest, image I may be discarded. However, if the highest similarity score is between another pair in the group (e.g. B-D), then one of that pair of images is excluded, and the new thumbnail image I is added to the group of thumbnails. In particular embodiments, selecting which image of the original pair to exclude may be based on their respective variance scores, feature scores, or how similar each of the two images are to the other images in the group.

In particular embodiments, after image-selection system 108 has determined a group of thumbnail images, image-selection system 108 may select one of the group of thumbnails for sending to a particular user requesting a thumbnail. As an example and not by way of limitation, a user may access a webpage that includes a number of links to various video streams, such as streamed movies. For each video stream, image-selection system 108 may have determined a group of four thumbnail images. In response to the user accessing the webpage, image-selection system 108 may pick one thumbnail image for each video stream to be shown to the user as a static image. In particular embodiments, selection of the best thumbnail for a particular user may be based on a Bayesian prediction based on the underlying valence score of each image, adjusted for the particular user requesting the thumbnail. In particular embodiments, the prediction may be further based on additional information received from real-world usage of the thumbnail images. This may be accomplished through AB testing wherein some users receive one image, other users receive another image, and the subsequent responses from the two groups of users may determine which image is more suitable. As an example and not by way of limitation, each of the four thumbnail images for a particular video stream may have already been sent to other users. Based on the responses from the users (e.g. whether the users subsequently clicked on the link), image-selection system 108 may determine that one of the four thumbnail images have been more successful with all users or users sharing the same demographic information as the requesting user, and select that one image to send to the requesting user. In particular embodiments, selection of a thumbnail may further depend on the relative ages of the thumbnails. In particular embodiments, the ages of the thumbnail images may be weighed more heavily if the corresponding video is very recent, such as a live streaming video. Selecting a thumbnail image based on age is discussed in more detail below.

In particular embodiments, the iterative search process may be used to determine one or more video segments with a high overall valence. As an example and not by way of limitation, image-selection system 108 may determine that a particular local region, if played as a short video clip, may have a high valence score. In particular embodiments, the short video clip may be played on a webpage prior to a user selecting a link to play the full video or video stream. As an example and not by way of limitation, rather than a static image comprising a link to a video, the link may be an animated Graphics Interchanged Format ("GIF") image or an animated HTML5 image which displays the entire local region selected. In particular embodiments, the short video clip may be played as an embedded video on a webpage, and a user may select the embedded video to access the full video.

In particular embodiments, image-selection system 108 may use the Metropolis-Hastings algorithm discussed above to sample, in parallel, multiple frames of a video, identify regions with high valence scores, and determine the video clips to be selected. In particular embodiments, image-selection system 108 may determine local regions in a way to excludes scene transitions. As an example and not by way of limitation, the Metropolis-Hastings algorithm may identify a region of 100 consecutive frames as having a high valence. However, filtering the individual frames of the region may reveal a scene transition occurring between frames 30 and 45 of the region. Playing the entire region as a single video clip would contain the scene transition and may not be useful to users. Image-selection system 108 may then choose video clips either from frames 1-30 of the region (optionally, adding in additional frames prior to frame 1 to add length to the video clip), or from frames 45-100 of the region. In particular embodiments, image-selection system 108 may choose the segment that has a higher overall valence, or a higher average valence score across all frames of the segment. In particular embodiments, image-selection system 108 may determine a plurality of short video clips, similar to selecting a plurality of thumbnail images. In particular embodiments, image-selection system 108 may determine relative weights of each of the short video clips based on their respective valence scores and/or their relative ages, send one or more short video clips to requesting users, and determine whether to adjust calculation of the valence score or winning short video clips based on subsequent user response.

Live Video and Recorded Video

In particular embodiments, selection of a high-valence image may be performed on a live video feed. As an example and not by way of limitation, a live video stream may be presented on a web site. Users who are interested in viewing the live video stream may access the video stream via a link to the web page displaying the live video stream. The links may be presented with other information associated with the content of the live video stream, such as the subject matter of the video, persons or entities depicted in the video or associated with the creation and distribution of the video, etc. A thumbnail image of the video may also be presented with the link, which may provide potential viewers of the video with additional information. In particular embodiments, the thumbnail may be poster art representative of the video stream. As an example and not by way of limitation, if the live video stream is a football game, a thumbnail image may depict the logos of the teams playing the game, or the football league or conference's logo.

In particular embodiments, the thumbnail image may be a frame of the live video stream. As an example and not by way of limitation, in the example of the football game, the thumbnail may be a frame taken from a recent play or a depiction of a player in the game. In particular embodiments, to increase the rate at which users viewing the thumbnail will interact with the thumbnail or link to access the live video stream, image-selection system 108 may select an image for the thumbnail that has a higher valence score, to increase the likelihood that a user will be interested and click on the link. As an example and not by way of limitation, in the example football game above, the thumbnail may depict a touchdown being scored, or another crucial play being made. In particular embodiments, image-selection system 108 may be able to rapidly update multiple video streams with relevant thumbnails as the video streams progress, without periodic manual selection of a thumbnail for each video stream, which may be less efficient.

In particular embodiments, as a live video stream progresses, image-selection system 108 may periodically update one or more thumbnail images being used in connection with the live video stream. As an example and not by way of limitation, a video stream may depict a football game where, at a first time, one team is winning. The best thumbnail for this video stream may depict the winning team's most recent scoring play. A user accessing a webpage containing a link to the video stream around this first time may view the winning team's scoring play as a thumbnail. If, at a later, second time, the losing team scores to tie the game, the thumbnail may be updated to show the game-tying scoring play. A user accessing a webpage at this second time may view the thumbnail of the game-tying play instead.

In particular embodiments, image-selection system 108 may periodically update the thumbnails for a particular video stream by sampling segments of a video stream. As an example and not by way of limitation, image-selection system 108 may record the video stream as it is broadcast, and every 2 minutes, image-selection system 108 may take the most recent 2-minute segment of video and analyze the valence of the frames within those 2 minutes. In particular embodiments, the analysis of the video segment may be slower than real-time. As an example and not by way of limitation, it may take image-selection system 108 4 minutes to determine a best image for the 2-minute segment. In particular embodiments, image-selection system 108 may process a plurality of video segments in parallel so that the thumbnail updates do not fall behind the live stream. As an example and not by way of limitation, image-selection system 108 may comprise a plurality of computing devices, and for a 10-minute video, image-selection system 108 may assign analysis of the first 2-minute segment to a first computing device; the second 2-minute segment to a second computing device; the third 2-minute segment to the first computing device (if the first computing device has completed analysis of the first segment), the fourth segment to the second computing device, and the fifth and last video segment to the first computing device again.

In particular embodiments, after each video segment is analyzed, image-selection system 108 may determine if the set of top thumbnail images for the video stream should be updated. In particular embodiments, a plurality of images may be selected from one video segment. In particular embodiments, only one image may be selected per segment. As an example and not by way of limitation, a video stream may already have four thumbnail images associated with the video stream. As a new video segment is analyzed, image-selection system 108 may determine if an image corresponding to the new video segment should replace one of the existing thumbnail images. In particular embodiments, image-selection system may keep track of which thumbnail images are currently selected by noting a timestamp of the selected frames, the associated valence scores, and a perceptual hash of the image. In particular embodiments, a perceptual hash of an image may be a hash value derived from the content of the image. In particular embodiments, if two images have similar perceptual hash values, it may indicate that the two images are actually similar to each other. When the thumbnail image from the new video segment is received, image-selection system 108 may consider whether the new thumbnail image has a higher valence score than the current set of thumbnail images. In particular embodiments, image-selection system 108 may also determine whether the new thumbnail is too similar to one of the existing thumbnails, image-selection system 108 may exclude the new thumbnail from consideration. In particular embodiments, the database of thumbnail images (e.g. the associated valence scores, time stamps, and perceptual hash) are updated each time a new thumbnail image is considered by image-selection system 108.

In particular embodiments, the valence scores of the selected thumbnails may be weighted by age. This may be important in a live video stream where events are changing rapidly, so that at a given moment in time, the thumbnail being displayed is most representative of the current video stream. In particular embodiments, image-selection system 108 may apply a decay factor to each thumbnail image, so that older thumbnail images have a proportionally lower valence score. In particular embodiments, image-selection system 108 may exclude thumbnail images after a predetermined amount of time has passed. As an example and not by way of limitation, image-selection system 108 may give any current thumbnail images that are more than 30 minutes old a score of zero, so that they cannot be selected and sent to a user.

In particular embodiments, image-selection system 108 may analyze video segments of a live video stream within a threshold time (e.g. within a threshold age), and select one or more thumbnail images to present to users. In particular embodiments, where there is a plurality of thumbnail images chosen, image-selection system 108 may calculate a likelihood that each of the thumbnail images is the best, based on the Bayesian prediction discussed above. As an example and not by way of limitation, the likelihood of each image being the best image may be based on the underlying valence scores of each image; previous user responses to these images or similar images; and the age of each image.

In particular embodiments, the probabilities for each of the thumbnail images to be the best image may be used to randomly select one of the thumbnails to send to a particular user. As an example and not by way of limitation, if a live video stream has three thumbnail images (A-C), and the calculated likelihood that image A is the best is 25%; that image B is the best is 40%; and that image C is the best is 35%, image-selection system may assign these probabilities to randomly select an image to send to a particular user. In other words, this means that the particular user may have a 25% chance of receiving image A; a 40% change of receiving image B; and a 35% chance of receiving image C. Based on subsequent user responses (e.g. whether the user interacted with the particular image they viewed), the probabilities for the images may be adjusted. In particular embodiments, as the selected images become older, they may be replaced with newer thumbnail images or images with higher valence scores.

As another example of a live video stream being analyzed by image-selection system 108, a public presentation may be recorded and streamed online. A public presentation may be a speech, a product launch or demonstration, conference proceedings, etc. The publisher of the presentation recording may wish to keep the thumbnail image for the link to the video stream updated, as the presentation is updated. As an example and not by way of limitation, a new presenter may take the stage at the presentation, or new subject matter may be raised by the presenter. Image-selection system 108 may sample the most recent video segment and determine one or more thumbnail images from the most recent segment. Selection of one or more thumbnails for presentation may be based on the respective valence scores, with a decay factor to discount older thumbnails. One or more "winning" thumbnails are more likely to be recent images from the video stream, and may be presented to users based on the probability distribution discussed above.

In particular embodiments, selection of a high-valence image may be performed periodically as part of a broadcast feed of content by a content provider. As an example and not by way of limitation, a content provider such as a cable television company may also provide a video stream of the same video content accessible on the cable channel. It may be necessary to create digital thumbnail assets corresponding to the video stream, which may not be available from the content provider if the original assets are video or film. In particular embodiments, image-selection system 108 may be used to select thumbnail images from within the digital video stream.

In particular embodiments, if the video assets are provided to image-selection system 108 prior to the broadcast, the thumbnail images may be created and presented concurrently with the actual broadcast. As an example and not by way of limitation, a content provider may be scheduled to broadcast several re-run episodes of a television show. The content provider may indicate to image-selection system 108 the starting and end time point for a particular content item within the stream, which may indicate a specific content item (such as one episode of a television show). Image-selection system 108 may analyze frames from that portion of the video and obtain one or more thumbnail images from within that time period of the video stream.

In particular embodiments, the selected thumbnail images may be ranked by their respective valence scores. Image-selection system 108 may select the top-ranked thumbnail images for consideration, after comparing the top-ranked thumbnail images to exclude duplicate or near-duplicate images. As an example and not by way of limitation, for a video stream comprising an episode of a television show, image-selection system 108 may select 20 high-valence thumbnail images, and rank them in order by their valence scores. Image-selection system 108 may look at the top six images, and compare them to each other. In particular embodiments, the comparison may be performed by comparing the perceptual hash values of each image and calculating a distance between the perceptual hash values. If the distance is less than a threshold value, then the images may be too similar. Continuing the example above, image-selection system 108 may determine that two of the top-six thumbnail images are similar (e.g. image #3 and #5), and discard the similar image having the lower valence score (e.g. #5). Image-selection system 108 may then add the seventh-highest thumbnail image to the set, and calculate similarities between the new set of six images (e.g. images #1-4, 6, and 7). If these images are not too similar to each other, then image-selection system 108 may use these selected thumbnail images.

In particular embodiments, a content provider may not provide start and end timestamps to image-selection system 108. Rather, a content provider may manually create a video segment from their video stream, and provide the segment separately to image-selection system 108. Image-selection system 108 may search for the best thumbnail images from the video segment, similarly to how image-selection system 108 would determine images based on a start and end time of a video stream.

Systems and Methods

FIG. 9A, and FIG. 9B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 may include a cache of high-speed memory connected directly with, in close proximity to, or integrated as part of the processor 910. The system 900 may copy data from the memory 915 and/or the storage device 930 to the cache 912 for quick access by the processor 910. In this way, the cache may provide a performance boost that avoids processor 910 delays while waiting for data. These and other modules may control or be configured to control the processor 910 to perform various actions. Other system memory 915 may be available for use as well. The memory 915 may include multiple different types of memory with different performance characteristics. The processor 910 may include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 may represent any number of input mechanisms, such as a microphone for speech, a touch-sensitive screen for gesture or graphical input, keyboard, mouse, motion input, speech and so forth. An output device 935 may also be one or more of a number of output mechanisms known to those of skill in the art. In some instances, multimodal systems may enable a user to provide multiple types of input to communicate with the computing device 900. The communications interface 940 may generally govern and manage the user input and system output. There is no restriction on operating on any particular hardware arrangement and therefore the basic features here may easily be substituted for improved hardware or firmware arrangements as they are developed.

Storage device 930 is a non-volatile memory and may be a hard disk or other types of computer readable media which may store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 may include software modules 932, 934, 936 for controlling the processor 910. Other hardware or software modules are contemplated. The storage device 930 may be connected to the system bus 905. In one aspect, a hardware module that performs a particular function may include the software component stored in a computer-readable medium in connection with the necessary hardware components, such as the processor 910, bus 905, display 935, and so forth, to carry out the function.

FIG. 9B illustrates a computer system 950 having a chipset architecture that may be used in executing the described method and generating and displaying a graphical user interface (GUI). Computer system 950 is an example of computer hardware, software, and firmware that may be used to implement the disclosed technology. System 950 may include a processor 955, representative of any number of physically and/or logically distinct resources capable of executing software, firmware, and hardware configured to perform identified computations. Processor 955 may communicate with a chipset 960 that may control input to and output from processor 955. In this example, chipset 960 outputs information to output 965, such as a display, and may read and write information to storage device 970, which may include magnetic media, and solid state media, for example. Chipset 960 may also read data from and write data to RAM 975. A bridge 980 for interfacing with a variety of user interface components 985 may be provided for interfacing with chipset 960. Such user interface components 985 may include a keyboard, a microphone, touch detection and processing circuitry, a pointing device, such as a mouse, and so on. In general, inputs to system 950 may come from any of a variety of sources, machine generated and/or human generated.

Chipset 960 may also interface with one or more communication interfaces 990 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 955 analyzing data stored in storage 970 or 975. Further, the machine may receive inputs from a user via user interface components 985 and execute appropriate functions, such as browsing functions by interpreting these inputs using processor 955.

It may be appreciated that exemplary systems 900 and 950 may have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per se.

Methods according to the above-described examples may be implemented using computer-executable instructions that are stored or otherwise available from computer readable media. Such instructions may comprise, for example, instructions and data which cause or otherwise configure a general purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures may comprise hardware, firmware and/or software, and may take any of a variety of form factors. Typical examples of such form factors include laptops, smart phones, small form factor personal computers, personal digital assistants, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

What is claimed is:

1. A method comprising:
    by a computing device, receiving a plurality of images;
    by the computing device, filtering the plurality of images to obtain a set of images;
    by the computing device, determining, for one or more images in the set of images, a valence score corresponding to each image;
    by the computing device, selecting a first image from the set of images based at least in part on the valence score of the first image;
    by the computing device, sending the first image for display;
    by the computing device, after sending the first image, receiving an update to the plurality of images, wherein the update comprises the set of images and one or more additional images;
    by the computing device, filtering the update to obtain an updated set of images;
    by the computing device, determining a valence score for one or more images in the updated set of images;
    by the computing device, selecting a second image from the one or more images in the updated set, wherein the selecting is based at least in part on the valence score of the second image; and
    by the computing device, sending the second image for display, wherein the second image replaces the first image.

2. The method of claim 1, wherein the plurality of images comprises a video.

3. The method of claim 1, wherein the filtering comprises excluding a particular image from the set of images based on:
    a blurriness level of the particular image;
    a determination that the particular image is near a scene transition in the plurality of images;
    an amount of text comprising the particular image; or
    a color level associated with a particular color of the particular image.

4. The method of claim 1, wherein the determining the valence score comprises determining values for one or more characteristics of the image, wherein each characteristic corresponds to a prediction of user responses to a particular image possessing the characteristic.

5. The method of claim 1, wherein the first image is sent to a user in response to a request for a thumbnail image from the user.

6. The method of claim 1, wherein the first image comprises a link to access the plurality of images.

7. The method of claim 1, further comprising:
    receiving, from a user, an indication of interest associated with the first image; and
    sending the plurality of images to the user.

8. The method of claim 1, wherein the selection of the first image is further based on an age of the first image.

9. The method of claim 1, wherein the first image corresponds to a subset of one or more images selected from the set of images, wherein selection of the subset of images is based at least in part on the valence scores of the images in the subset.

10. The method of claim 9, wherein the selection of the subset of images is further based on:
    for a particular image in the set, comparing the particular image to one or more images already selected in the subset to determine a similarity between the particular image and the one or more images; and
    excluding the particular image from selection into the subset if the similarity exceeds a predetermined threshold.

11. The method of claim 9, further comprising:
    receiving, from a first user, an indication of interest associated with the first image;
    selecting a third image from the subset;
    sending the third image for display to a second user;
    receiving, from the second user, an indication of interest associated with the third image;
    receiving a request for a thumbnail image from a third user; and
    selecting one of the first image or the third image for sending to the third user, wherein the selecting is based at least in part on an indication of interest from the first user and the indication of interest from the second user.

12. The method of claim 9, wherein the comparison is based on a perceptual hash value associated with the particular image and perceptual hash values associated with the one or more images.

13. The method of claim 9, wherein selection of each image of the subset of images comprises:
    selecting one or more sample sets of one or more images from the set of images, wherein:
        the one or more sample sets are selected iteratively;
        a first sample set comprises one or more images; and
        one or more subsequent sample sets each comprise one or more images selected based at least in part on valence scores corresponding to the images in the previous sample set;

based on the valence scores of each image in the sample set, determining a local region of images in the set of images;

determining a feature score for one or more of the images in the local region; and selecting a particular image in the local region to be added to the subset of images, wherein the selection is based at least in part on the feature score of the particular image and a valence score calculated for the particular image.

14. The method of claim 1, wherein the selection of the first image is further based on a market segment associated with a user receiving the first image.

15. The method of claim 14, wherein the market segment is based on geographic, demographic, psychographic, or behavioristic parameters.

16. The method of claim 1, wherein the plurality of images comprises a segment of a video stream, wherein the segment is defined by a starting time and an ending time.

17. The method of claim 1, wherein the first image comprises one or more images comprising a video clip, wherein the selection of the first image is based on an aggregated valence score for the one or more images.

18. A system comprising:
one or more processors; and
a memory coupled to the processors comprising instructions executable by the processors, the processors being operable when executing the instructions to:
receive a plurality of images;
filter the plurality of images to obtain a set of images;
determine, for one or more images in the set of images, a valence score corresponding to each image;
select a first image from the set of images based at least in part on the valence score of the first image;
send the first image for display;
after sending the first image, receive an update to the plurality of images, wherein the update comprises the set of images and one or more additional images;
filter the update to obtain an updated set of images;
determine a valence score for one or more images in the updated set of images;
select a second image from the one or more images in the updated set, wherein the selecting is based at least in part on the valence score of the second image; and
send the second image for display, wherein the second image replaces the first image.

19. The system of claim 18, wherein the plurality of images comprises a video.

20. The system of claim 18, wherein the filtering comprises excluding a particular image from the set of images based on:
a blurriness level of the particular image;
a determination that the particular image is near a scene transition in the plurality of images;
an amount of text comprising the particular image; or
a color level associated with a particular color of the particular image.

21. The system of claim 18, wherein the determining the valence score comprises determining values for one or more characteristics of the image, wherein each characteristic corresponds to a prediction of user responses to a particular image possessing the characteristic.

22. The system of claim 18, wherein the first image is sent to a user in response to a request for a thumbnail image from the user.

23. The system of claim 18, wherein the first image comprises a link to access the plurality of images.

24. The system of claim 18, further comprising:
receiving, from a user, an indication of interest associated with the first image; and
sending the plurality of images to the user.

25. The system of claim 18, wherein the selection of the first image is further based on an age of the first image.

26. The system of claim 18, wherein the first image corresponds to a subset of one or more images selected from the set of images, wherein selection of the subset of images is based at least in part on the valence scores of the images in the subset.

27. The system of claim 26, wherein the selection of the subset of images is further based on:
for a particular image in the set, comparing the particular image to one or more images already selected in the subset to determine a similarity between the particular image and the one or more images; and
excluding the particular image from selection into the subset if the similarity exceeds a predetermined threshold.

28. The system of claim 26, further comprising:
receiving, from a first user, an indication of interest associated with the first image;
selecting a third image from the subset;
sending the third image for display to a second user;
receiving, from the second user, an indication of interest associated with the third image;
receiving a request for a thumbnail image from a third user; and
selecting one of the first image or the third image for sending to the third user, wherein the selecting is based at least in part on an indication of interest from the first user and the indication of interest from the second user.

29. The system of claim 26, wherein the comparison is based on a perceptual hash value associated with the particular image and perceptual hash values associated with the one or more images.

30. The system of claim 26, wherein selection of each image of the subset of images comprises:
selecting one or more sample sets of one or more images from the set of images, wherein:
the one or more sample sets are selected iteratively;
a first sample set comprises one or more images; and
one or more subsequent sample sets each comprise one or more images selected based at least in part on valence scores corresponding to the images in the previous sample set;
based on the valence scores of each image in the sample set, determining a local region of images in the set of images;
determining a feature score for one or more of the images in the local region; and
selecting a particular image in the local region to be added to the subset of images, wherein the selection is based at least in part on the feature score of the particular image and a valence score calculated for the particular image.

31. The system of claim 18, wherein the selection of the first image is further based on a market segment associated with a user receiving the first image.

32. The system of claim 31, wherein the market segment is based on geographic, demographic, psychographic, or behavioristic parameters.

33. The system of claim 18, wherein the plurality of images comprises a segment of a video stream, wherein the segment is defined by a starting time and an ending time.

34. The system of claim 18, wherein the first image comprises one or more images comprising a video clip, wherein the selection of the first image is based on an aggregated valence score for the one or more images.

35. One or more computer-readable non-transitory storage media embodying software that is operable when executed to:
receive a plurality of images;
filter the plurality of images to obtain a set of images;
determine, for one or more images in the set of images, a valence score corresponding to each image;
select a first image from the set of images based at least in part on the valence score of the first image; and
send the first image for display;
after sending the first image, receive an update to the plurality of images, wherein the update comprises the set of images and one or more additional images;
filter the update to obtain an updated set of images;
determine a valence score for one or more images in the updated set of images;
select a second image from the one or more images in the updated set, wherein the selecting is based at least in part on the valence score of the second image; and
send the second image for display, wherein the second image replaces the first image.

36. The media of claim 35, wherein the plurality of images comprises a video.

37. The media of claim 35, wherein the filtering comprises excluding a particular image from the set of images based on:
a blurriness level of the particular image;
a determination that the particular image is near a scene transition in the plurality of images;
an amount of text comprising the particular image; or
a color level associated with a particular color of the particular image.

38. The media of claim 35, wherein the determining the valence score comprises determining values for one or more characteristics of the image, wherein each characteristic corresponds to a prediction of user responses to a particular image possessing the characteristic.

39. The media of claim 35, wherein the first image is sent to a user in response to a request for a thumbnail image from the user.

40. The media of claim 35, wherein the first image comprises a link to access the plurality of images.

41. The media of claim 35, further comprising:
receiving, from a user, an indication of interest associated with the first image; and
sending the plurality of images to the user.

42. The media of claim 35, wherein the selection of the first image is further based on an age of the first image.

43. The media of claim 35, wherein the first image corresponds to a subset of one or more images selected from the set of images, wherein selection of the subset of images is based at least in part on the valence scores of the images in the subset.

44. The media of claim 43, wherein the selection of the subset of images is further based on:
for a particular image in the set, comparing the particular image to one or more images already selected in the subset to determine a similarity between the particular image and the one or more images; and
excluding the particular image from selection into the subset if the similarity exceeds a predetermined threshold.

45. The media of claim 43, further comprising:
receiving, from a first user, an indication of interest associated with the first image;
selecting a third image from the subset;
sending the third image for display to a second user;
receiving, from the second user, an indication of interest associated with the third image;
receiving a request for a thumbnail image from a third user; and
selecting one of the first image or the third image for sending to the third user, wherein the selecting is based at least in part on an indication of interest from the first user and the indication of interest from the second user.

46. The media of claim 43, wherein the comparison is based on a perceptual hash value associated with the particular image and perceptual hash values associated with the one or more images.

47. The media of claim 43, wherein selection of each image of the subset of images comprises:
selecting one or more sample sets of one or more images from the set of images, wherein:
the one or more sample sets are selected iteratively;
a first sample set comprises one or more images; and
one or more subsequent sample sets each comprise one or more images selected based at least in part on valence scores corresponding to the images in the previous sample set;
based on the valence scores of each image in the sample set, determining a local region of images in the set of images;
determining a feature score for one or more of the images in the local region; and
selecting a particular image in the local region to be added to the subset of images, wherein the selection is based at least in part on the feature score of the particular image and a valence score calculated for the particular image.

48. The media of claim 35, wherein the selection of the first image is further based on a market segment associated with a user receiving the first image.

49. The media of claim 48, wherein the market segment is based on geographic, demographic, psychographic, or behavioristic parameters.

50. The media of claim 35, wherein the plurality of images comprises a segment of a video stream, wherein the segment is defined by a starting time and an ending time.

51. The media of claim 35, wherein the first image comprises one or more images comprising a video clip, wherein the selection of the first image is based on an aggregated valence score for the one or more images.

* * * * *